United States Patent [19]

Setoguchi

[11] Patent Number: 4,608,653
[45] Date of Patent: Aug. 26, 1986

[54] FORM CREATING SYSTEM

[76] Inventor: Ryozo Setoguchi, 50, Minamisomeshimachi, Sendai, Miyagi, Japan

[21] Appl. No.: 659,406

[22] Filed: Oct. 10, 1984

[30] Foreign Application Priority Data

Mar. 30, 1984 [JP] Japan .................................. 59-63006
Apr. 18, 1984 [JP] Japan .................................. 59-78123

[51] Int. Cl.$^4$ .......................................... G06F 15/626
[52] U.S. Cl. .................................................. 364/522
[58] Field of Search ...................... 364/512, 521, 522; 340/729

[56] References Cited

U.S. PATENT DOCUMENTS 3,602,702  8/1971  Warnock ............................ 364/522
4,127,849 11/1978  Okor .................................. 364/522 X
4,550,315 10/1985  Bass et al. ......................... 364/522 X

*Primary Examiner*—Michael L. Gellner
*Attorney, Agent, or Firm*—Koda and Androlia

[57] ABSTRACT

An improved unique form creating system is disclosed which provides for free access to a form to be created throughout its whole process ranging from its first step or model design step to its final step or manufacturing step.

There are also similar devices such as a device which is capable of easily detecting the position of an intersection point between a predetermined straight line and a predetermined plane, a device capable of cutting a predetermined plane linearly or curvedly to provide its sectional face with ease, a device capable of easily finding a contour line of intersection of bodies, i.e., a continuum of intersection points between a predetermined surface and its partner surface, or a controlling or processing device operable based on each of the above-mentioned devices.

A predetermined surface is divided into a predetermined number of surfaces to detect an intersection point of the predetermined surface with a predetermined straight line out of the thus-divided surfaces. To obtain the contour line, one of two surfaces is divided into a large number of surfaces, intersecting surfaces are detected out of the thus-divided surfaces, and then these intersecting surfaces are joined together. An operation to divide a triangle into four smaller triangles may be sequentially repeated a desired number of times so as to provide a dense polyhedron.

17 Claims, 54 Drawing Figures

FIG. 21
FIG. 22
FIG. 23
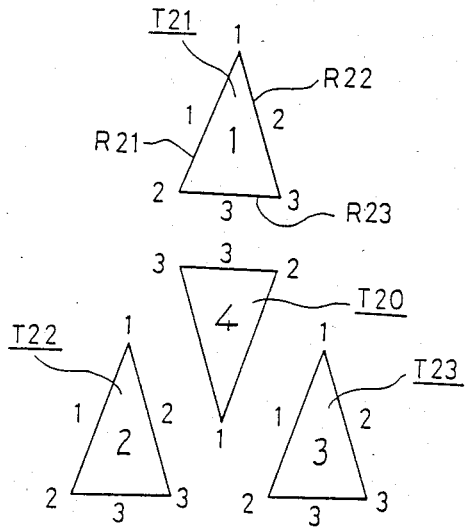
FIG. 24
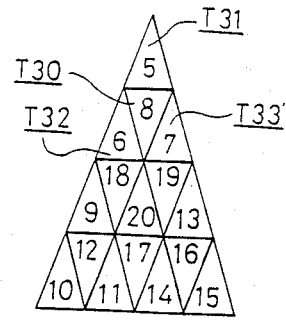

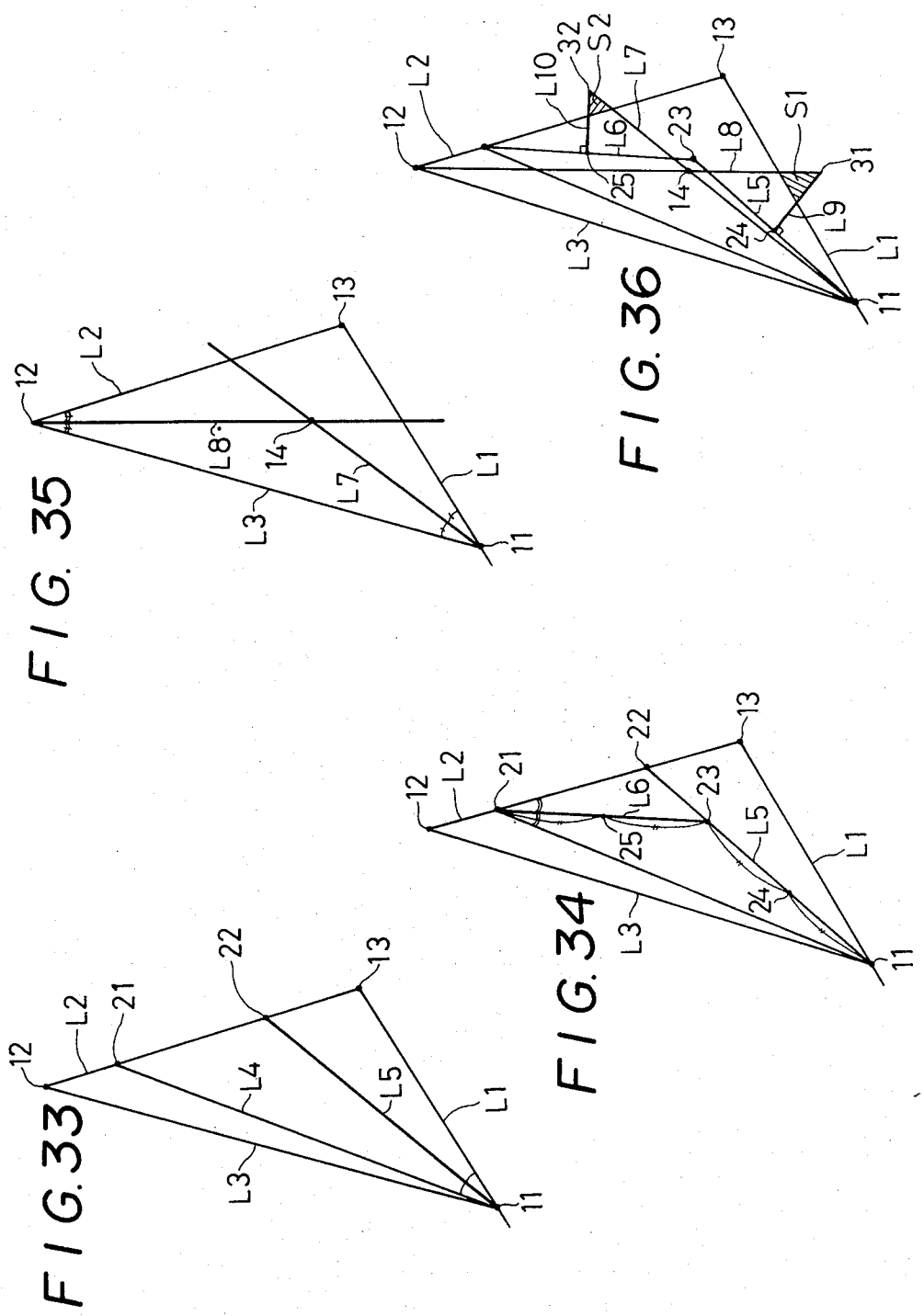

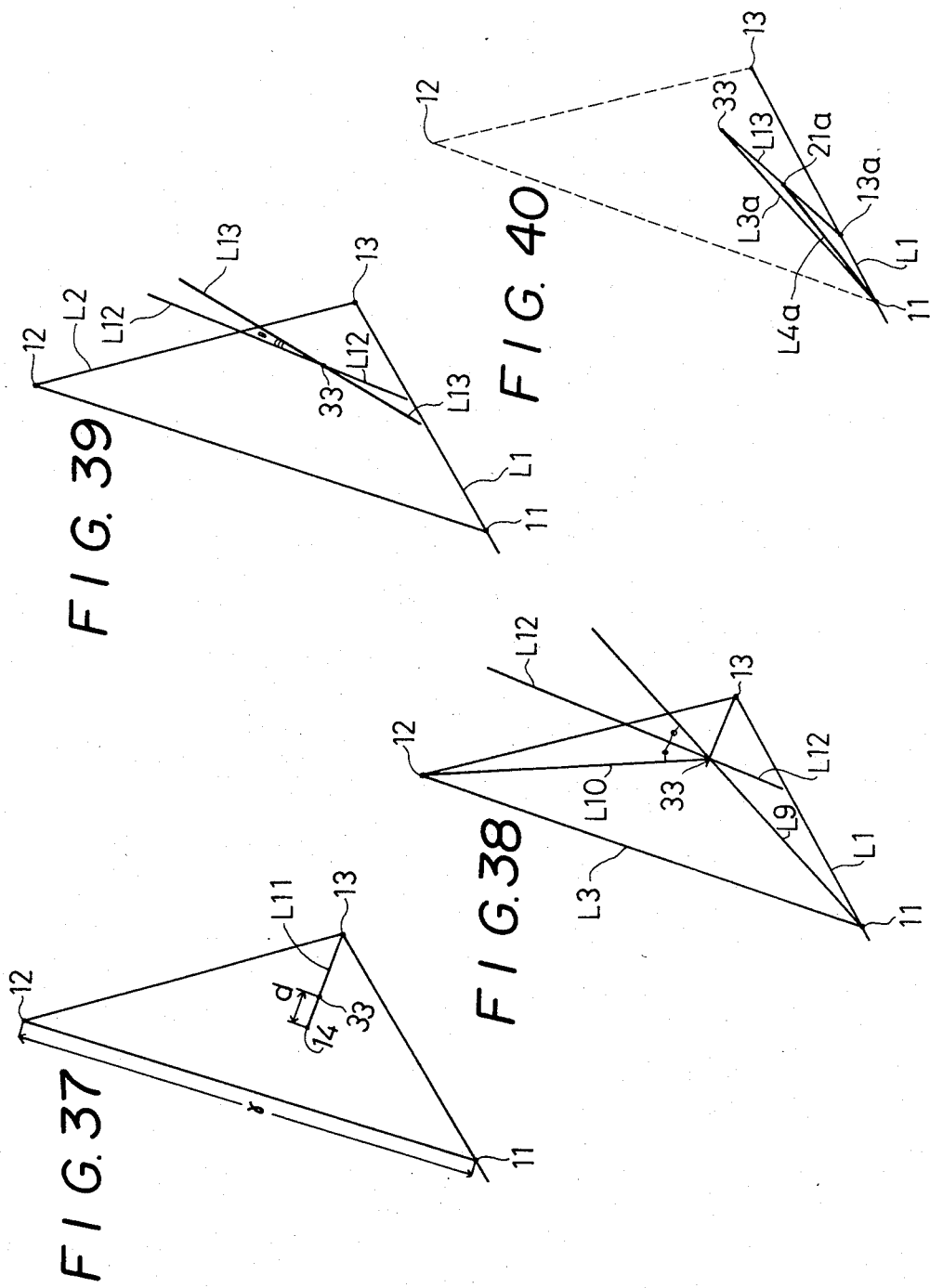

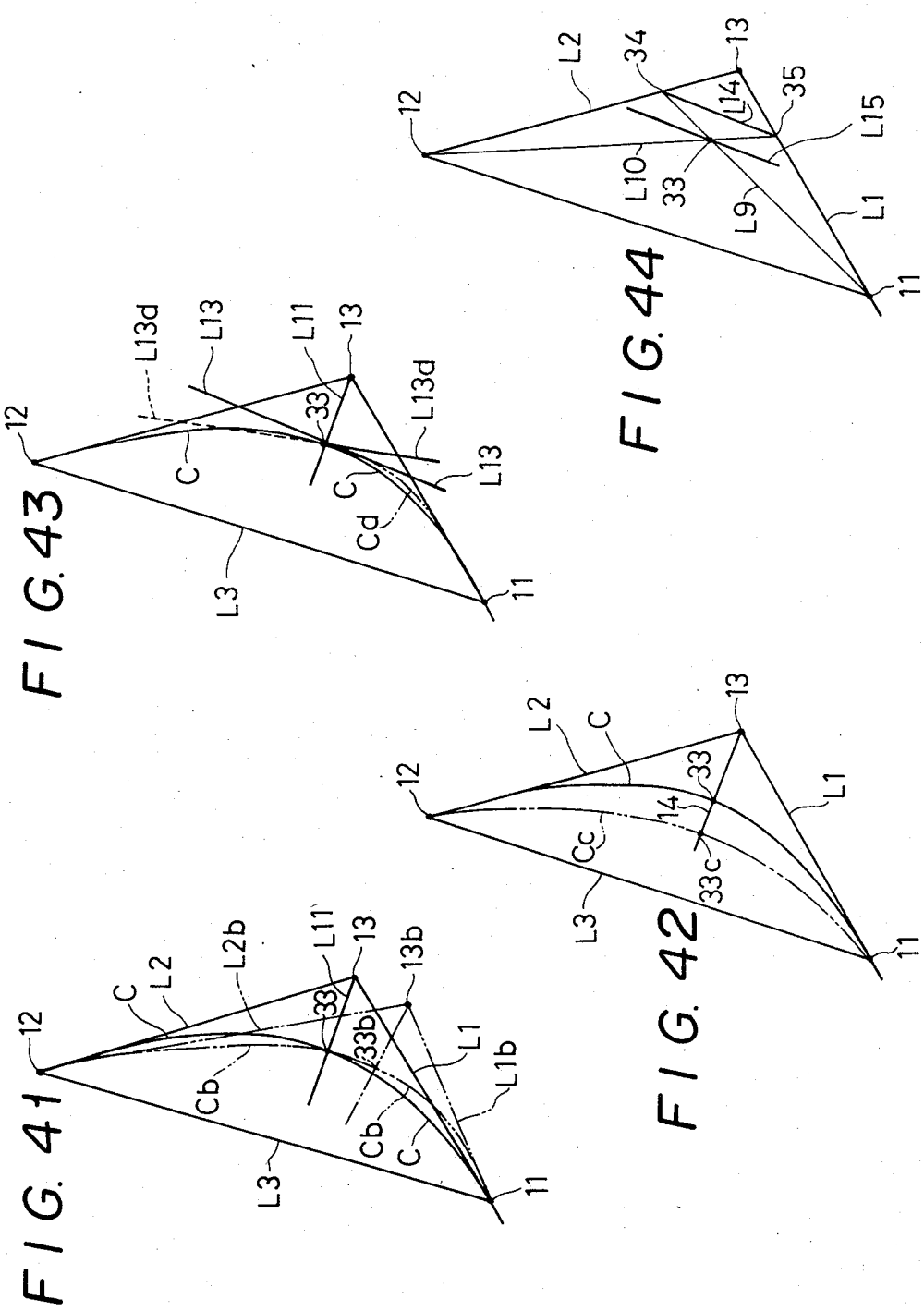

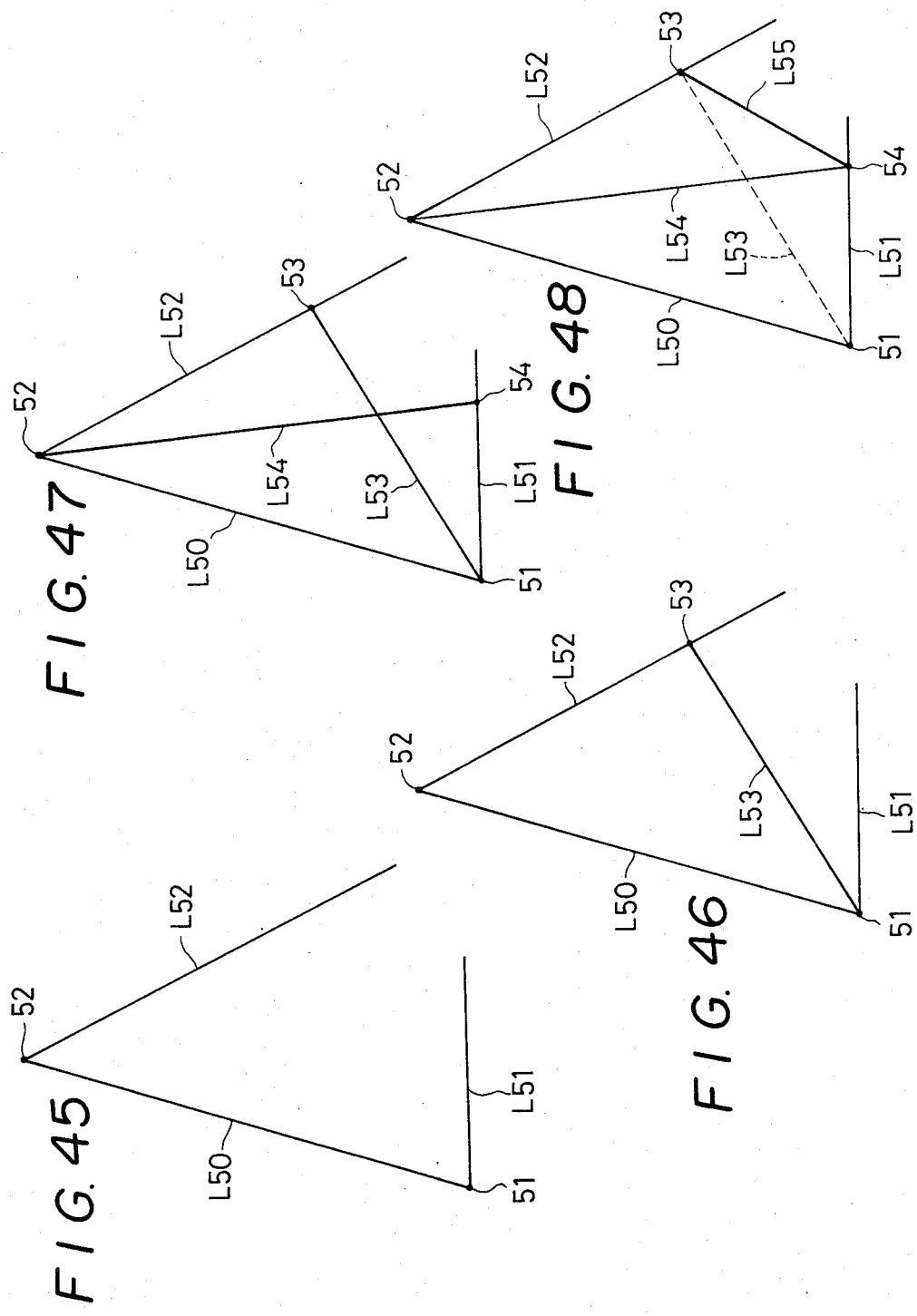

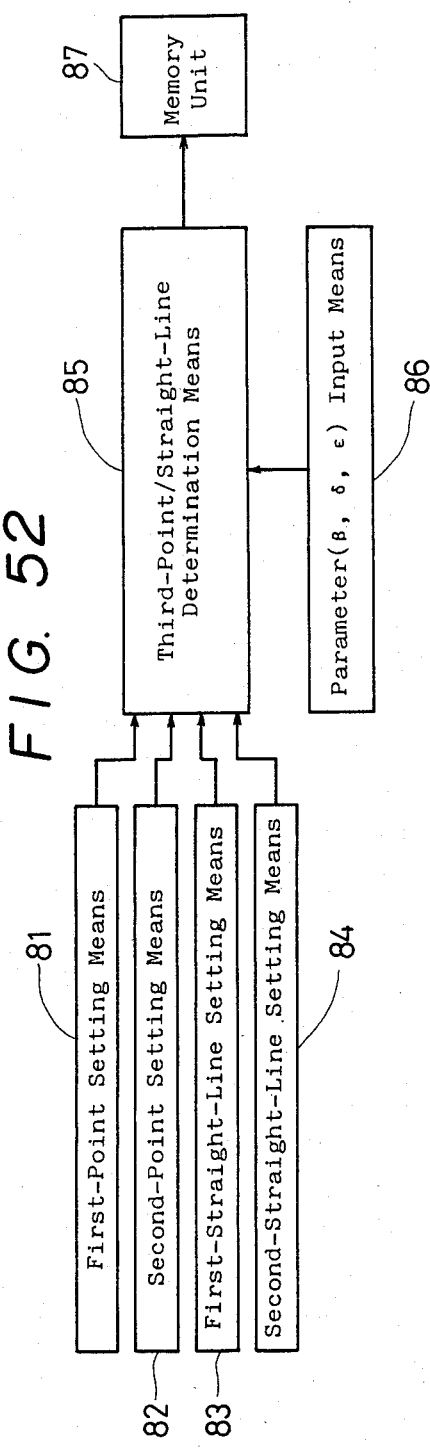
F I G. 52
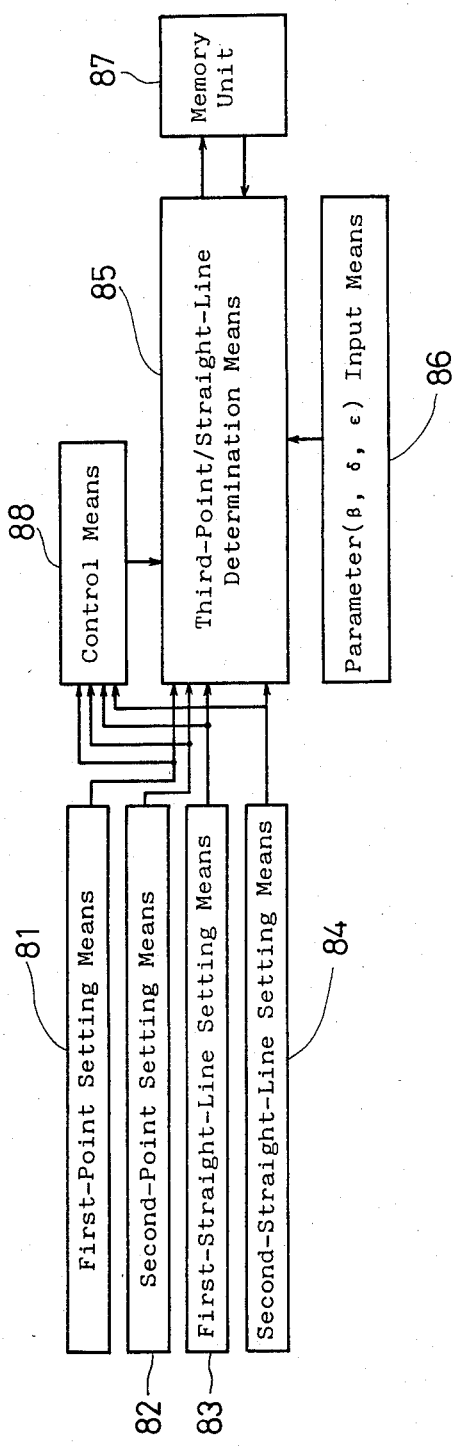
F I G. 53

FORM CREATING SYSTEM

BACKGROUND OF THE INVENTION

1. Field of the Invention

The present invention relates to an improve and advanced system which is capable fo creating a desired three-dimensional form or modifying its once-created three-dimensional form in the fields of CAD (Computer Aided Design) and/or CAM (Computer Aided Manufacturing), NC machine tool, computer graphics, computer vision and other similar applications.

2. Description of the Prior Art

In the fields of CAD, CAM, NC machine tools, computer vision, computer graphics and the like, conventionally there have been well known three types of modellings to express a desire or predetermined form; that is, they are a wire frame modeller, a surface modeller, and a solid modeller.

In brief, with the conventional wire frame modeller, the above-mentioned kinds of forms can be expressed by using constructed points which are roughly populated as a finite type of a set which has lower density.

In case when the surface modeller is used, such kinds of forms can also be expressed by the same type of a set which has higher density.

In these cases, the two modellers of the above type can be performed by the way of estimating the lacked points among the given points obtained so as to express the form, that is, by means of interpolation operation based on the functional approximation.

The solid modeller piles up simple or primitive forms obtained as the typical sets in which the points are densely populated in a manner similar to a building-blocks-work to express a predetermined form. Each of these three conventional methods features a function to be able to express forms for solid bodies.

However, when used to express a three-dimensional form, the above-mentioned three conventional methods each lack in flexibility of expression so that they are unable to perform their functions sufficiently. Also, it well known that a form expression is one embodiment of a form producing/finishing process, while a form creation is also another one embodiment of the same process. All of the above-mentioned three conventional modellings, however, are found incapable of performing a continuous and throughout processing operation between these two embodiments.

For example, when the prior art solid modeller is used, it is true that some of three-dimensional forms can be expressed by means of combination of simple forms, but the solid model method is inherently unable to provide a free and detailed expression of such three dimensional forms. Thus, it can be naturally said that it is almost impossible to carry out a continuous and throughout processing operation from its expression step to its form creation step.

SUMMARY OF THE INVENTION

Accordingly, it is an object of the invention to provide an improved unique form creating system which provides for free access to a form to be created throughout its whole process ranging from its model design step to its form manufacturing step, while eliminating the drawbacks in the above-mentioned prior art modelling methods.

It is another object of the invention to provide similar devices such as a device which is capable of easily detecting the position of an intersection point between a predetermined straight line and a predetermined surface, a device capable of cutting a predetermined surface linearly or curvedly to provide its section face easily, a device capable of easily obtaining a contour line of intersection of bodies or a continuation of intersection points between a predetermined surface and its partner surface, or a controlling or processing device operable based on each of the above-mentioned devices.

In accomplishing these objects, according to the invention, a predetermined surface is first divided into a given number of sections or a plurality of divided surfaces, out of such plurality of divided surfaces, an intersection-point-containing surface having an intersection point with a predetermined straight line is detected, and this intersection-point-containing surface is again divided into a predetermined number of sections or a plurality of divided surfaces, and thereafter said intersection-point-containing surface is detected out of the last-divided surfaces; these operations are repeated to detect a point of intersection between the predetermined straight line and the first surface.

Also, to cut a surface linearly or curvedly, the above-mentioned operations are repeatedly performed by moving a predetermined straight line in a given direction.

To obtain the above-mentioned contour line, a surface other than a standard surface is divided into a predetermined number of divided surfaces, one or more intersecting surfaces each having two side faces relative to the standard surface are detected out of the predetermined number of divided surfaces, each of the intersecting surfaces is again divided into a predetermined number of divided surfaces, and the intersecting surfaces are again detected out of the last-divided surfaces; these division/detection operations are repeated.

It should be noted that, when this process to detect the positions of such intersection points is displayed on a display unit, the very process provides CAD, and that data on the thus-created forms, as it is, can also be used to operate NC machine tools or the like.

Further, according to the invention, a desired form of triangle (first-stage triangle) is set up, this first-stage triangle is divided into four triangles (second-stage triangle), and each of the second-stage triangles is again divided into four triangles; these operations are repeated to form a large number of triangles so that a continuation of the large number of triangles provides a dense polyhedron.

Here again, when the form creating process is displayed on a display unit, the very process itself provides CAD, and data on the thus-created forms, as it is, can also be used to operate NC machine tools or the like.

It should be noted that the term "create" is used to mean "create and/or generate" in this specification.

The foregoing and other related objects and features of the invention will be more apparent from a reading of the following description of the disclosure found in the accompanying drawings and the novelty thereof pointed out in the appended claims.

BRIEF DESCRIPTION OF THE DRAWINGS

FIG. 21 is a view to illustrate a state in which only one of the four second-stage triangles has been divided into four third-stage triangles;

FIG. 22 is a view to illustrate a state in which all of the above four second-stage triangles have been divided into four third-stage triangles respectively;

FIG. 23 is an exploded view of FIG. 20;

FIG. 24 is a plan view of FIG. 22;

FIG. 33 is a view to explain how to determine a constant α necessary in finding out a third point (that is, a division vertex);

FIG. 34 is a view to explain how to find out an internal center of an isosceles triangle;

FIG. 35 is a view to explain how to find out an internal center of a fundamental triangle;

FIG. 36 is a view to explain how to determine an amount of unbalance or unequilibriuum S;

FIG. 37 is a view to illustrate how to find out a distance d from the internal center of the fundamental triangle to a third point to be currently found;

FIGS. 38 and 39 are views respectively to explain how to find out a third straight line at a third point;

FIG. 40 is a view to illustrate how to find out a new third point (a new division vertex);

FIG. 41 is a view to explain how a locus of division vertexes can be changed when, among parameters, only the directions of first and second straight lines are varied;

FIG. 42 is a view to explain how a locus of division vertexes can be changed when, among parameters, only a position control parameter β is varied;

FIG. 43 is a view to illustrate how a locus of division vertexes can be changed when, among parameters, only a tangent control parameter δ is varied;

FIG. 44 is a view to illustrate a principle to simply find out a third straight line;

FIG. 45 is a view to illustrate the setting of a first point, a second point, a first straight line and a second straight line in order to determine a three-dimensional locus of division vertexes;

FIG. 46 is an orthographic view of a first straight line in a plane formed by a chord and a second straight line;

FIG. 47 is an orthographic view of a second straight line in a plane formed by a chord and a first straight line;

FIG. 48 is a view to explain how to form a fundamental triangle;

FIG. 52 is a block diagram of an embodiment of a system to perform the setting of division vertexex;

FIG. 53 is a block diagram of another embodiment of a system to perform the setting of division vertexes; and, FIG. 54 is a block diagram of still anothre embodiment of a system to perform the setting of division vertexes.

DETAILED DESCRIPTION OF PREFERRED EMBODIMENTS OF THE INVENTION

Figure 1:
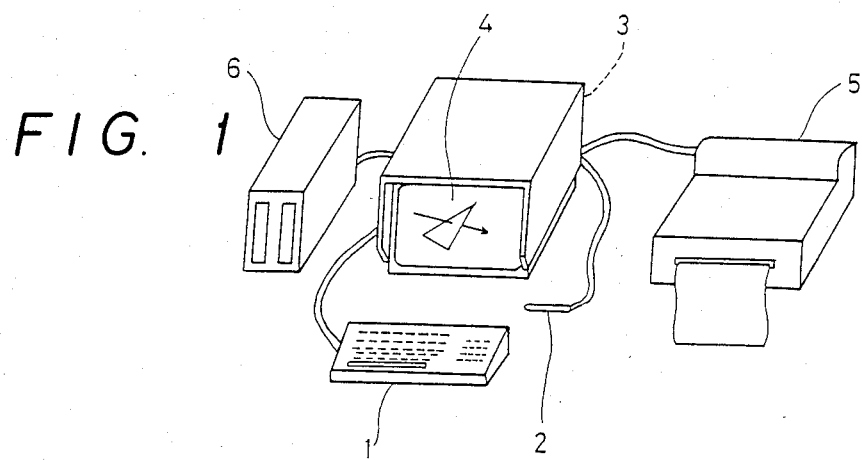
FIG. 1 is a general view of a system illustrating an embodiment of the invention.

FIG. 1 illustrates a general view of a system, that is, an embodiment of the invention.

In this embodiment, there are provided a keyboard 1 and a light pen 2 which are used to input the position information on a form to be created, or the position information on a form to be drawn. There is incorporated an operation circuit 3 to perform a predetermined operational processing based on signals input from input means such as the keyboard 1 and light pen 2. There are also included a display unit 4 to display the thus-created forms, a printer 5 to print such forms, and an external memory unit 6 to store such forms in the form of predetermined signals such as magnetic signals and optical signals.

Now, we will describe the principles of the present invention.

According to one aspect of the invention, at first, a predetermined surface is divided into a predetermined number of surfaces, and, out of the the thus-divided surfaces, a surface is detected which contains a point of intersection with a predetermined straight line. Then, this intersection-point-containing surface is again divided into a predetermined number of surfaces, and then a surface containing such intersection point is similarly detected out of the last-divided surfaces. By repeating these detection operations, such intersection point in which the predetermined straight line and the original surface, i.e., the first-predetermined surface intersect with each other can be finally detected. An example of such detection process is illustrated in FIGS. 2-5.

Also, according to another aspect of the invention, a triangle of a desired form (a first-stage triangle) is first established and divided into four triangles (second-stage triangle), and then each of these four second-stage triangles is further divided into four triangles; by repeating these division operations, a large number of triangles are formed and a continuation of such large number of triangles is used to form a dense polyhedron. These division steps are shown sequentially in FIGS. 18-29.

Figure 2:
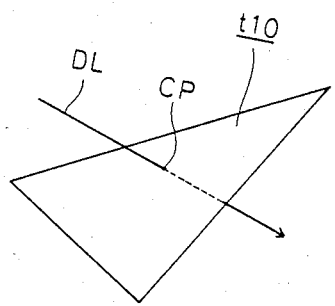
FIG. 2 is a view to illustrate a surface to be detected from an intersection point is to be detected as well as a straight line which intersects with the surface to be detected.

Referring now to FIG. 2, there are illustrated a surface to be detected t10 from which the above-mentioned intersection point to be detected, and a straight line DL to intersect with the surface to be detected t10.

Here, it is assumed that the straight line DL and the surface to be detected t10 cross each other in an intersection point CP. However, it is considered that the intersection point CP is not yet found out at an actual position on the coordinates. In other words, the coordinates of the intersection point CP are to be obtained from now. It is also assumed that the coordinates of each of vertices of the surface to be detected t10, the coordinates of passing points of the straight line DL, and the direction of the line DL are all values that are currently known.

Figure 3:
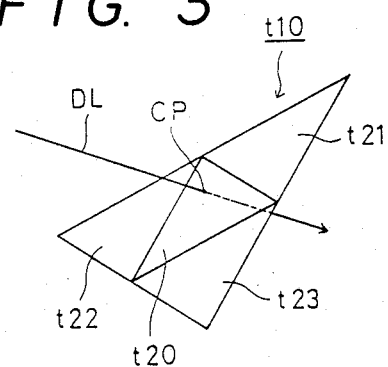
FIG. 3 is a view to illustrate a state in which the surface to be detected has been divided into four triangles.

FIG. 3 illustrate a state in which the surface to be detected t10 has been divided into four triangles, namely, t20, t21, t22 and t23.

The above-mentioned four triangles comprise a central triangle t20, and three peripheral triangles t21, t22, and t23 enclosing the central triangle t20 (operations to divide a triangle into four triangles will be described in FIG. 18 and its following figures.). In the process of this division, the coordinates of each of the vertices of the central triangle t20 are determined. Here, it is assumed that the intersection point CP exists within the central triangle t20. A surface that contains the intersection point CP, such as the above-mentioned central triangle t20, is called an intersection-point-containing surface.

Next, the triangle is again divided into four sections. This time, however, all of the above-mentioned four triangles t20-t23 are not divided, but only the triangle t20 which is an intersection-point-containing surface is divided.

Figure 4:
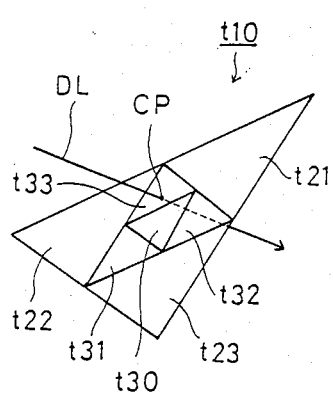
FIG. 4 is a view to illustrate a state in which a central triangle t20, i.e., an intersection-point containing surface has been divided into four triangles.

FIG. 4 illustrates a state in which the central triangle t20, an intersection-point-containing surface, has been divided into four triangles t30, t31, t32 and t33.

In this case, the coordinates of each of vertices of the central are determined. Here, the intersection point CP is considered to be present within the peripheral triangle t33. That is, in this instance, the peripheral triangle t33 provides an intersection-point-containing surface.

Next, among the four triangles t30–t33, only the peripheral triangle t33, an intersection-containing-surface, is divided.

Figure 5:
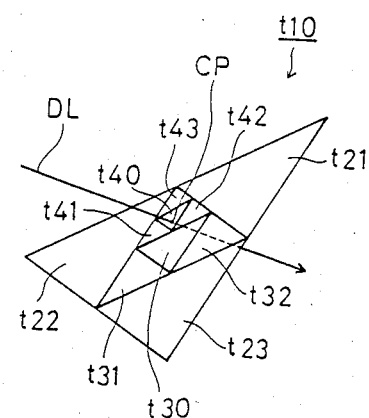
FIG. 5 is a view to illustrate a state in which a peripheral triangle t33, which is an intersection-point containing surface, has been divided into four triangles.

In FIG. 5, there is illustrated the peripheral triangle t33 that is an intersection-point-containing surface after it is divided into four triangles t40, t41, t42 and t43.

In this case, the coordinates of each of vertices of the central triangle t40 are determined. Here, the intersection point CP is assumed to be present within the central triangle t40. Then, the central triangle t40 provides an intersection-point-containing surface in this instance.

The foregoing operations can be repeated to detect or find out the coordinates of the intersection point CP in which the straight line DL and the surface to be detected t10 cross each other. The more becomes the number of such repetitions, the higher becomes the accuracy of the coordinates of the crossing point PC.

Although, in the above-mentioned example, the surface to be detected t10 comprises a plane surface, it may be a curved surface.

Figure 10:
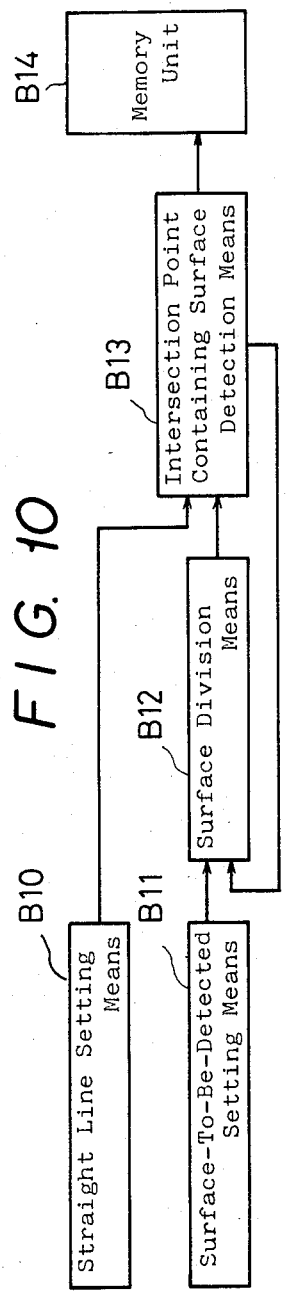
FIG. 10 is a block diagram of an embodiment according to the principles illustrated in FIGS. 2–5.

Now, FIG. 10 illustrates a block diagram of an embodiment of the invention according to the above-mentioned principles.

In this figure, a straight line setting means B10 is used to set up the straight line DL passing through a desired point and having a desired direction, and a surface-to-be-detected setting means B11 is dedicated to setting up the surface to be detected t10 having a desired form from which the intersection point is to be detected.

A surface division means B12 is used to divide a predetermined surface into a predetermined number of surfaces, while an intersection-point-containing-surface detection means B13 is dedicated to detecting the intersection-point containing surface, which is a surface containing the point of intersection of the straight line DL with the surface to be detected t10, out of a plurality of surfaces divided by the surface division means B12. Reference character B14 designates a memory means to store information on the coordinates of the intersection point obtained and the like.

That is, in the illustrated embodiment of the invention, the surface to be detected t10 is divided into a predetermined number of surfaces by the surface dividing means B12, the intersection-point containing surface is detected out of these divided surfaces, then the detected intersection point containing surface is again divided into a predetermined number of surfaces, and the intersection point containing surface is detected out of the last-divided surfaces; these division/detection operations are repeated to find out the point of intersection of the straight line and the surface to be detected t10.

As described above, since only the intersection point containing surface among the divided surfaces is to be divided and detected, the invention can perform its whole operation processing at higher speeds.

The operation means 3 shown in FIG. 1 has the functions of the straight-line setting means B10, the surfaceto-be-detected setting means B11, the surface dividing means B12, and the intersection-point-containing-surface detection means B13.

Figure 6:
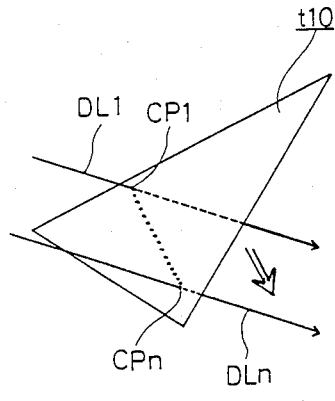
FIG. 6 is a view basically similar to FIGS. 2–5, illustrating a locus of intersection points when a straight line DL is moved linearly.
Figure 7:
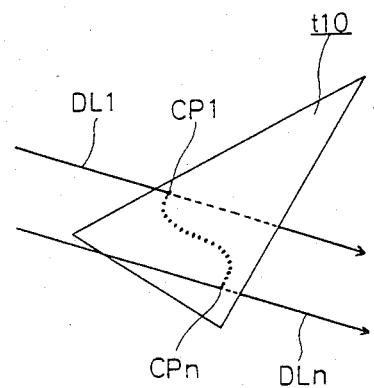
FIG. 7 is a view basically similar to FIGS. 2–5, illustrating a locus of intersection points when a straight line DL is parallel displaced sequentially and curvedly.

Now, FIGS. 6 and 7 illustrate the principles of another embodiment of the invention.

FIG. 6 is essentially similar to FIGS. 2-5, illustrating a locus of intersection points obtained when the straight line DL is moved linearly.

In other words, an intersection point of the surface to be detected t10 and the straight line DL is called CP1 and an intersection point obtained when the straight line DL is moved sequentially and parallelly up to the position of DLn is called CPn. In detecting each of intersection points obtained, i.e., CP1 through CPn, the operations described in FIGS. 2-5 are carried out repeatedly for each.

FIG. 7 is also essentially similar to FIGS. 2-5, illustrating a locus of intersection points obtained when the straight line DL is moved curvedly and sequentially.

In FIGS. 6 and 7, the surface to be detected t10 may be a curved surface. Examples thereof are shown in FIGS. 8 and 9.

Figure 8:
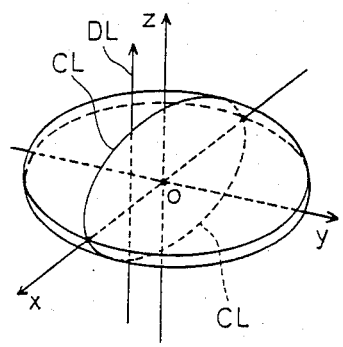
FIG. 8 is a view to illustrate a locus CL of intersection points obtained when an ellipsoid is employed as the surface to be detected.

Specifically, FIG. 8 illustrates a locus of intersection points obtained when an ellipsoid is employed as a surface to be detected and the straight line DL is moved parallelly in ZX plane. This locus CL is considered to be a cutting line of an ellipsoid.

Figure 9:
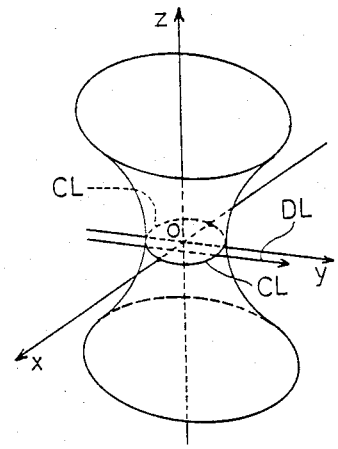
FIG. 9 is a view to illustrate a locus CL of intersection points obtained when a hyperbolic paraboloid is employed as the surface to be detected.

FIG. 9 illustrates a locus CL of intersection points obtained when a hyperbolic paraboloid is employed as a surface to be detected and the straight line DL is parallel moved in a plane xy. This locus CL is considered to be a cutting line of a hyperbolic paraboloid.

Figure 11:
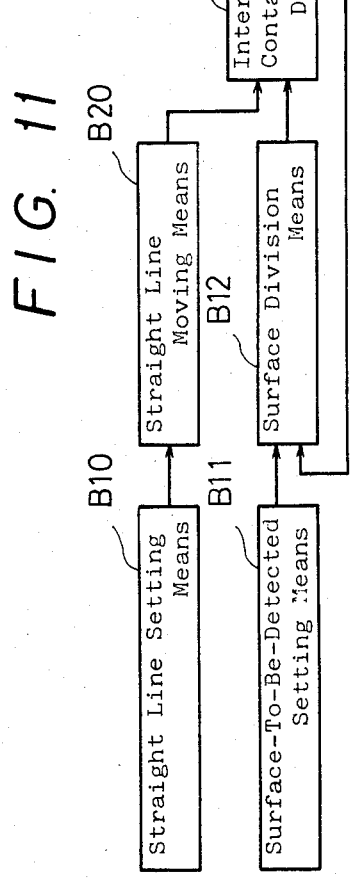
FIG. 11 is a block diagram of an embodiment according to the principles illustrated in FIGS. 6 and 7.

Now, FIG. 11 shows a block diagram of an embodiment according to the principles illustrated in FIGS. 6 and 7. Here, the same components as in FIG. 10 are designated by the same references and the description thereof are omitted. In this figure, a straight line moving means 20 is used to move the straight line DL by steps of a predetermined distance. In particular, such means 20 is capable to displace the straight line DL parallelly in a linear or curved manner or displace the line DL in a non-parallel way.

Specifically, in the embodiment illustrated in FIG. 11, the surface to be detected t10 is divided into a given number of surfaces (it may be 4 or any other number) by the surface division means B12, an intersection point containing surface is next detected out of the given number of divided surfaces, the detected intersection point containing surface is then divided again into a predetermined number of surfaces, and the intersection point containing surface is finally detected out of the predetermined number of divided surfaces; these division/detection operations are repeated to detect the intersection point of the straight line DL and the surface to be detected t10. At the same time, when the straight line DL is displaced by the straight line moving means 20, division/detection operations similar to the above are repeatedly performed for every step of displacement of the straight line DL as well.

The operation means 3 as illustrated in FIG. 1 is provided with the functions of the straight line setting means B10, the surface-to-be-detected setting means B11, the surface division means B12, the intersection point containing surface detection means B13, and the straight line moving means B20.

FIGS. 12-15 illustrate the principles of another embodiment of the invention.

In the embodiment illustrated in FIGS. 12-15, an intersecting line (a contour line of intersection of bodies) of a contour body having a standard surface with a contour body having other surface than the standard surface (that is, a partner surface or an opposing surface) is to be found out. In this embodiment, such other surface is divided into a predetermined number of surfaces, a surface having two side faces with respect to the standard surface (an intersecting surface) is detected out of the predetermined number of divided surfaces, the detected intersecting surface is again divided into a predetermined number of surfaces, and the intersecting surface is again detected out of the predetermined number of the last-divided surfaces; these division/detection operations are repeated.

The operation to divide the partner surface into a predetermined number of surfaces, together with the dividing operation with respect to FIG. 3, will be described in FIG. 18 and its following figures. Here, we explain how to find out the above-mentioned intersecting surface.

Figure 12:
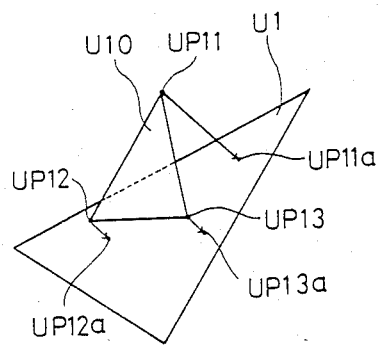
FIG. 12 is a view to illustrate a state in which the standard surface and its partner surface do not intersect with each other.

FIG. 12 shows a case where a standard surface U1 and a partner surface U10 do not intersect with each other, namely, the partner surface U10 is positioned above the standard surface U1. In this case, when the partner surface U10 is viewed from left-top down to right-bottom in FIG. 12, all of the vertexes, i.e., UP11, UP12 and UP13 of the partner surface U1 are positive in direction relative to their respectively projected points in the standard surface U1, i.e., UP11a, UP12a and UP13a (a direction facing from the left-bottom to the right-bottom in FIG. 1 is considered as positive.).

Figure 13:
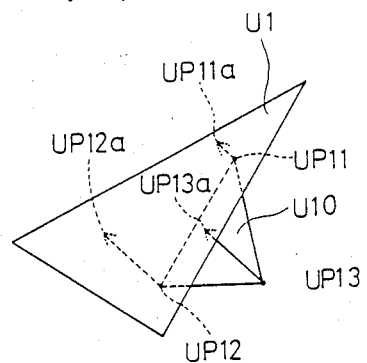
FIG. 13 is a view to illustrate a state in which the standard surface and its partner surface do not intersect with each other.

On the other hand, FIG. 13 illustrates a case where the partner surface U10 is situated below the standard surface U1 and both surfaces U1 and U10 do not intersect with each other. In this case, when viewing the partner surface U10 from left-top down to right-bottom in FIG. 13, all of the vertexes of the partner surface U10, or UP11, UP12 and UP13 are negative in direction relative to their respective projected points in the standard surface U1, or UP11a, UP12a and UP13a.

Figure 14:
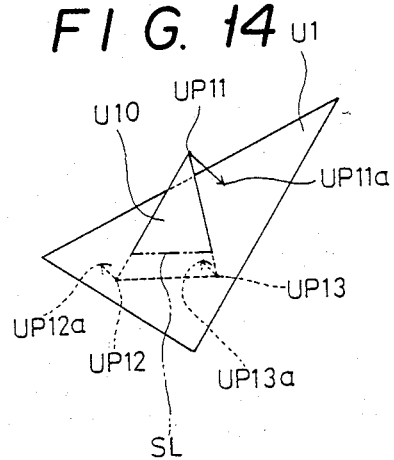
FIG. 14 is a view to illustrate a state in which the partner surface and standard surface intersect with each other.

FIG. 14 illustrates a case where the partner surface U10 intersects with the standard surface U1.

In this case, when viewing the partner surface U10 from the left-top down to the right-bottom in FIG. 14, one vertex UP11 of the partner surface U10 is positive in direction relative to its projected point in the standard surface U1, while other two vertexes thereof UP12 and UP13 are negative in direction relative to their respective projected points in the standard surface U1, namely UP12a and UP13a.

In other words, if the direction of one vertex of the partner surface U10 when viewed from a predetermined direction relative to the standard surface U1 is different from those of other vertexes of the partner surface U10 relative to the standard surface U1 when viewed from the predetermined direction, then it is decided that the partner surface U10 is an intersecting surface (a surface having two sections which exist on the sides different from each other with respect to the standard surface). Also, in FIG. 14, a contour line of intersection of the two surfaces SL is shown by a two-dot chained line.

Figure 15:
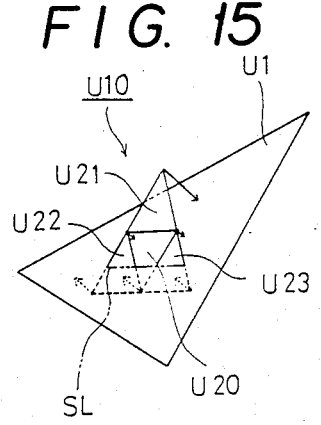
FIG. 15 is a view to illustrate a state in which the partner surface shown in FIG. 14 has been divided into four triangles.

FIG. 15 illustrates a case where the partner surface U10 in FIG. 14 has been divided into four triangles.

The thus-divided four triangles are a central triangle U20 and three peripheral triangles U21, U22 and U23. These four triangles are respectively decided whether they are the intersecting surfaces or not in the above-mentioned manner. As a result of this, three triangles U20, U22 and U23 are decided to be the intersecting surfaces. It is necessary to divide the triangles into four sections again, respectively. The triangles to be divided, however, are nothing but the intersecting surfaces in this case. For this reason, the triangle U21 is not divided. In this manner, according to the principles of the invention, in its operational process there are produced some divided sections which are not necessary to be further divided and they can be excluded from further operation, resulting in the increased operation speed.

Further, after the intersecting surfaces have been divided into further four triangles respectively, a detection operation is performed on every of these divided triangles to find out intersecting surfaces out of them. These division and detection operations are repeatedly performed to obtain a large number of tiny intersecting surfaces and a continuation of these tiny intersecting surfaces provides the contour line of intersection SL. The above-mentioned standard surface or partner surface may be a curved surface.

Figure 16:
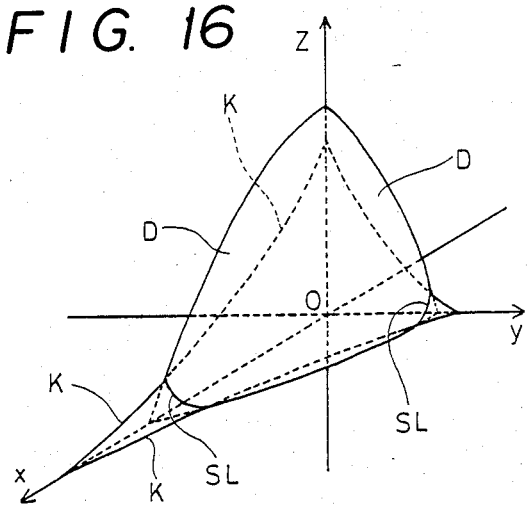
FIG. 16 is a view to illustrate two contour lines of intersection of bodies, SL, respectively produced by a catenary and an ellipsoid.

FIG. 16 illustrates a contour line of intersection SL formed by a curved surface K comprising catenaries and an ellipsoid D. In this figure, broken lines represent the hidden parts of each of the curved surfaces.

Figure 17:
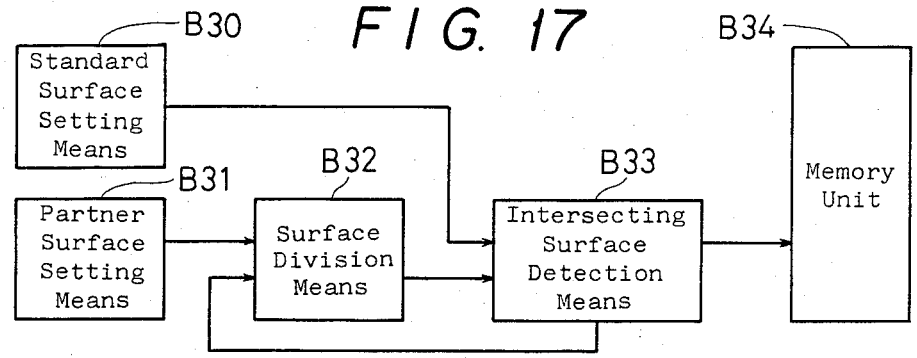
FIG. 17 is a block diagram of an embodiment according to the principles shown in FIGS. 12–15.

FIG. 17 illustrates a block diagram of an embodiment of the invention according to the above-mentioned principles.

In this figure, a standard surface setting means B30 is used to set up a standard surface U1 having a desired form, and a partner surface setting means B31 is dedicated to set up a partner surface U10 having a desired form and different from the standard surface U1.

A surface division means B32 is used to divide a pre-determined surface into a predetermined number of surfaces, while an intersecting-surface detection means B33 is used to detect one or more intersecting surfaces whose vertexes exist in the different sides from each other with respect to the standard surface U1, out of surfaces divided from the partner surface U10 by the surface division means B32. Here, reference B34 designates a memory means to store the position information on contour lines obtained and the like.

In other words, according to this embodiment, the partner surface U10 is divided into a predetermined number of surfaces by the partner surface division means B32, one or more intersecting surfaces are next detected out of the predetermined number of divided surfaces, each of the thus-detected intersecting surfaces is again divided into the predetermined number of surfaces, and one or more intersecting surfaces are detected out of the predetermined number of the last-divided surfaces; these division/detection operations are repeatedly performed to detect the contour lines of intersection of the partner surface U10 and the standard surface U1. It should be noted here that the standard surface U1 and the partner surface U10 have a relative relationship with each other and thus they can be reversed in relationship to each other.

The operation means 3 shown in FIG. 1 is equipped with the functions of the standard surface setting means B30, partner surface setting means B31, surface division means B32 and intersecting-surface detection means B33.

Next, we will describe an operation to divide the surface to be detected t10, standard surface U1, partner surface U10 and the like.

At first, let us consider a case where a triangle of a desired form (first-stage triangle) is established, this first-stage triangle is then divided into four triangles (second-stage triangle), and these four second-stage triangles are again divided into four triangles, respectively; these division operations are performed repeatedly to produce a large number of triangles, and a continuation of these many triangles provides a dense polyhedron. The above-mentioned first-stage triangle corresponds to each of the surface to be detected t10, standard surface U1 and partner surface U10. These dividing steps are shown sequentially in FIGS. 18–29.

Figure 18:
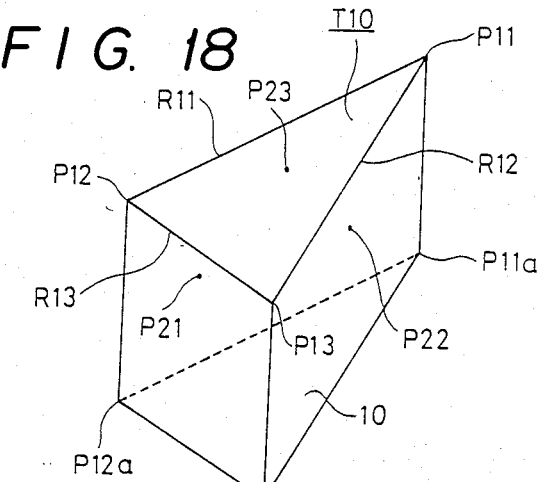
FIG. 18 is a view of a first-stage triangle established in a desired form.

FIG. 18 illustrates a first-stage triangle.

A triangle T10 having a desired form is first set up as an initial step in forming a dense polyhedron. This triangle is called a first-stage triangle. The first-stage triangle T10 includes three vetices P11, P12, P13 and three sides R11, R12, R13. Based on the first-stage triangle T10, triangles are sequentially divided into four triangles respectively.

Due to the convenience of illustration, it is assumed that in FIG. 18 the first-stage triangle T10 is projected in a projection surface 10 and the three vertices of the projected triangle are expressed by P11a, P12a and P13a, respectively.

Generally, for example, in case of a plane enclosed by points P12, P13, P13a and P12a, a division point is to be set in either right-hand or left-hand space adjacent to such plane. However, in this embodiment, for clarity of explanation, there is provided a point 21 within this plane, and this point 21 is considered to be the first division vertex. Similarly, within a plane enclosed by points P13, P11, P11a and P13a there is provided a point 22 and it is considered as the second division vertex, while within a plane enclosed by points P11, P12, P12a and P11a there is provided a point, P23, and it is considered as the third division vertex. Operations to find out the first, second and third division vertices P21, P22 and P23 from the respective vertices P11, P12 and P13 will be described in FIG. 31 and its following figures later.

The first, second and third division vertices P21, P22 and P23 are connected to one another to establish a central triangle T20. One of the sides of the central triangle T20 and Point 11 are used to form a peripheral triangle T21, a second side of the central triangle T20 and Point 12 are used to form a peripheral triangle T22 and the remaining side of the central triangle T20 and Point 13 is used to form a peripheral triangle T23.

In other words, after establishment of the first-stage triangle T10, there are aribitrarily set up three points and these three points are then joined to form a central triangle. One of the arbitrary three points and an arbitrarily selected side of the central triangle are used to form a peripheral triangle outside of the central triangle. In this way, three peripheral triangles are produced.

Figure 19:
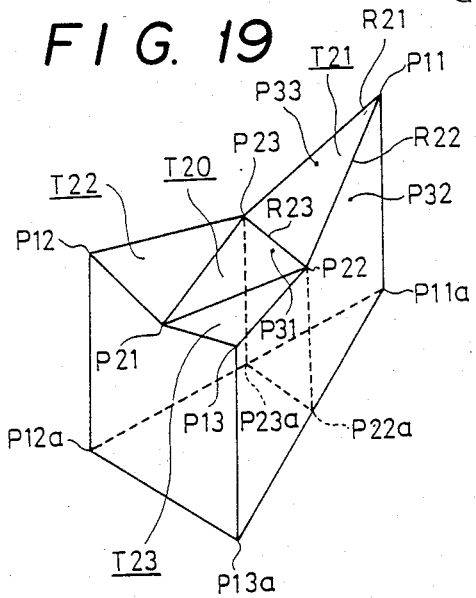
FIG. 19 is a view of the above first-stage triangle divided into four second-stage triangles.
Figure 20:
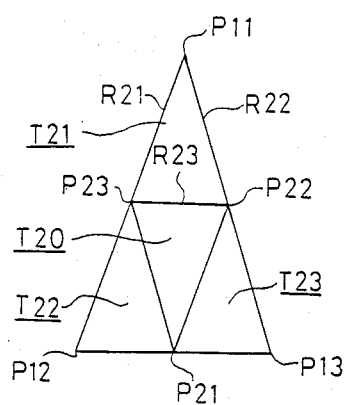
FIG. 20 is a plan view of the triangle shown in FIG. 19.

FIG. 19 illustrates a state in which the first-stage triangle T10 has been divided into four triangles in the above-mentioned manner, and a plan view thereof is shown in FIG. 20.

Thus, the fundamental elements have been established to create a dense polyhedron based on a triangle.

Next, in FIG. 19, when points P22a and P23a are considered as the intersection points of vertices P22 and P23 with the projection surface 10, a point P31 is set up within a plane enclosed by points P23, P22, P22a and P23a and it is called a new first division vertex. Similarly, a point P32 is set up within a plane enclosed by points P22, P11, P11a and P22a, and it is called a new second division vertex, while a point P33 is established within a plane enclosed by points P11, P23, P23a and P11a, and it is called a new third division vertex.

FIG. 21 illustrate a state in which the peripheral triangle T21 has been divided into four triangles.

Specifically, the new first, second and third division vertices in FIG. 19, P31, P32 and P33 are joined to set up a new central triangle T30. One of the sides of the central triangle T30 and P11 are used to establish another peripheral triangle T31; another side of the central triangle T30 and P23 are used to set up another peripheral triangle T32; and, the remaining side of the central triangle T30 and P33 are used to produce another peripheral triangle T33. In this way, the triangle T21, which is one of the second-stage triangles, can be again divided into four triangles.

Although FIG. 21 shows the state in which only one of the peripheral triangles, T21, has been decomposed into four triangles, other peripheral triangles T22, T23 and the central triangles T20 can be divided into four in a similar manner, respectively.

FIG. 22 illustrates a state in which the other peripheral triangles T22, T23 and the central triangle T20 have been also divided into four triangles, respectively.

When the first-stage triangle is divided into four triangles, the resultant central and peripheral triangles are called the second-stage triangles. Also, when the second-stage triangles are divided into four respectively, the resultant central and peripheral triangles are called the third-stage triangles. Similarly, this is to be repeated in the following up to the n-stage triangles. As mentioned above, based on the first-stage triangle T10, all triangles obtained can be divided into four triangles sequentially, and these division operations can be repeated to form a dense polyhedron.

The more is the number of the above-mentioned stages, n, the higher the accuracy or density of the created polyhedron.

FIG. 23 illustrates a state in which the central triangle T20 and the peripheral triangles T21, T22 and T23 shown in FIG. 20 are separated from one another.

In FIG. 23, the three peripheral triangles T21, T22 and T23 are respectively given identification Nos. in the order of a clockwise direction (in the illustrated embodiment, the identification Nos. are FIGS. 1, 2 and 3.), and then the central triangle T20 is given an identification No. (in the illustrate embodiment, it is a FIG. 4.). Also, the same identification Nos. as mentioned above are given to the respective sides of the second-stage triangles T20, T21, T22 and T23 in the clockwise-direction order. By doing so, topological structures can be advantageously determined for the second-stage triangles T20, T21, T22 and T23, as in a plane graph.

The respective sides of the second-stage triangles are also given identification Nos. respectively. In particular, taking one of the second-stage triangles as an example, the identification Nos. should be given to the respective sides of the second-stage triangle so that the sum of the identification No. of one of vertices thereof and the identification No. of an opposing side of the vertex becomes 4.

FIG. 24 illustrates identification Nos. given to the respective third-stage triangles after the triangles division operations have been performed up to the third-stage triangles. While with respect to the second-stage triangles, as shown in FIG. 23, the identification Nos. 1-4 are used, with respect to the third-stage triangles, the identification numbers begin from 5 as illustrated in FIG. 24. In particular, first, the identification Nos. (5-8) are given to the four triangles contained in the peripheral triangle T21 (Identification No. 1) in the order of a clockwise direction and the central triangle, and, thereafter, in the order of the peripheral triangles T22 and the central triangle T20, four identification Nos. are applied to each of these triangles, similarly. With respect to the fourth-stage triangles and their following stage triangles, the identification Nos. will be given similarly to the above-mentioned manner.

Figure 25:
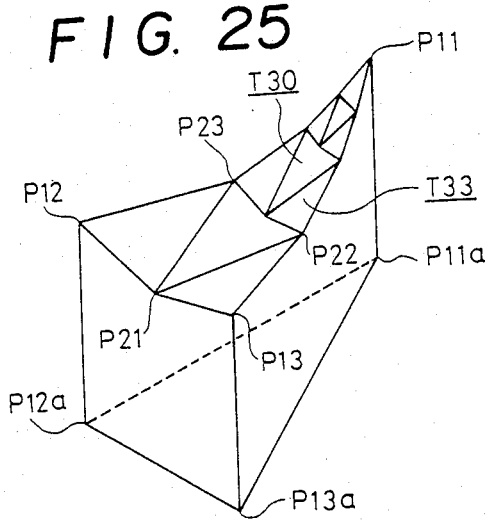
FIG. 25 is a view to illustrate a state in which only one of the above four third-stage triangles has been divided into four fourth-stage triangles.

FIG. 25 illustrates a case where only the third-stage triangle T31 has been divided into four triangles.

Although in the above-mentioned embodiment the surfaces created by division are concave, if the division vertex is considered to be present in the upper portion of the figures, then the created surface becomes concave. Also, a free combination of the concave and convex surfaces may be selected, for example, the created surface may comprise a concave surface in one portion there-of and a convex surface in the remaining portions thereof.

Now, FIGS. 26-29 respectively illustrate cases where when the first-stage triangle is divided its projected triangle has a different form from that of the first-stage triangle. In other words, in case of FIGS. 18-25, even when the first-stage triangle T10 is divided in some stages, each of the projected triangles is identical in form with the first-stage triangle T10, while, in case of FIGS. 26-29, when the first-stage triangle T10 is divided into four triangles, the projected form of each of the divided triangles is different from that of the first-stage triangle T10, that is, it is extended or shortened in its horizontal direction.

Figure 26:
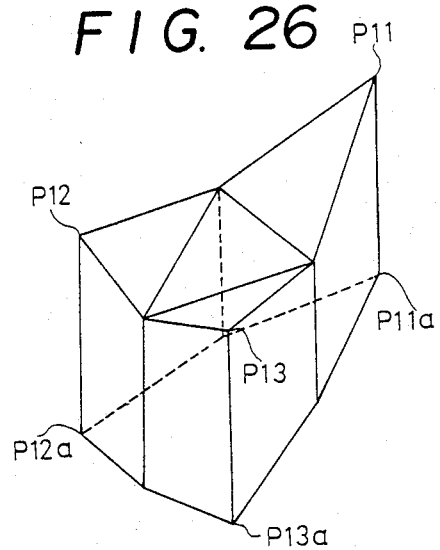
FIG. 26 is a view to illustrate a state in which, while the first-stage triangle is divided into the four second-stage triangles, its whole form is expanded.
Figure 27:
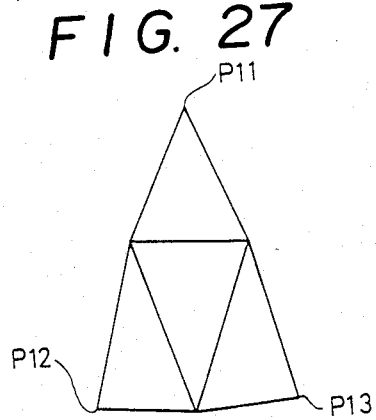
FIG. 27 is a plan view of FIG. 26.

FIG. 26 illustrates a case where, when the first-stage triangle T10 is divided into four triangles, its whole form is expanded. FIG. 27 is a plan view of FIG. 26.

Figure 28:
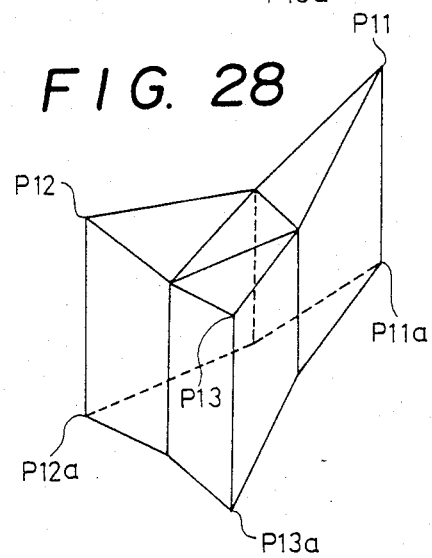
FIG. 28 is a view to illustrate a state in which, while the first-stage triangle is divided into the four second-stage triangles, its whole form is contracted.
Figure 29:
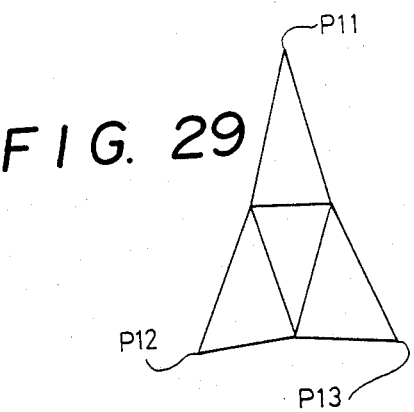
FIG. 29 is a plan view of FIG. 28.

FIG. 28 illustrated a case where, when the first-stage triangle T10 is divided into four triangles, its whole form is contacted. FIG. 29 is a plan view of FIG. 28.

In the above-mentioned cases shown in FIGS. 26-29, the first, second, and third division vertices are established respectively at positions other than the side faces of the triangular pyramid shown in FIG. 18. That is, the first, second and third division vertices can be set up at arbitrary positions.

As in the cases in FIGS. 26-29 where the first-stage triangle is divided into its second-stage triangles, when the first-stage triangle is divided into the n-th stage triangles, its form can be expanded or contracted arbitrarily.

Figure 30:
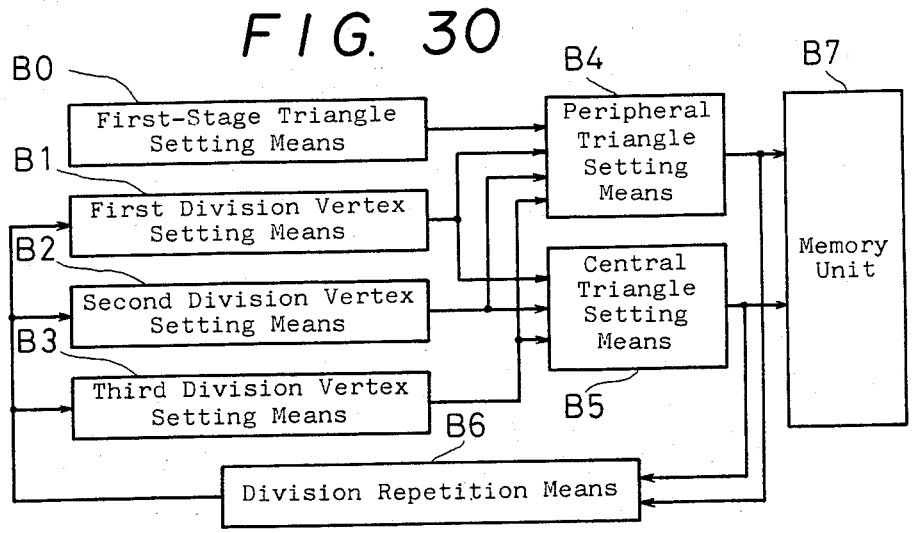
FIG. 30 is a block diagram of an embodiment of the invention.

FIG. 30 is a block diagram of an embodiment of the invention, illustrating the functions of performing the above-mentioned dividing operations. These functions are owned by the operation means 3 in FIG. 1.

In this figure, a first-stage triangle setting means B0 is used to set up the first-stage triangle T10 that is a triangle having a desired form.

First-division-vertex setting means B1 is used to set up a first division vertex within a plane containing two arbitrary vertices of the first-stage triangle T10 and an arbitrary point that exists in a plane other than the planes of the first-stage triangle T10. Second-division-vertex setting means B2 is dedicated to establishing a second division vertex within a plane containing another combination of two vertices of the first-stange triangle T10 vertices and an arbitrary point that exists in a plane other than the planes of the first-stage triangle T10. Third-division-vertex setting means B3 is used to set up a third division vertex within a plane containing the remaining combination of two vertexes of the first-stage triangle vertices and an arbitrary point that exists in a plane other than the planes of the first-stage triangle T10.

Also, central-triangle setting means B4 is used to set up a central triangle by joining a first division vertex, a second division vertex and a third division vertex, while peripheral-triangle setting means B5 is dedicated to setting up three peripheral triangles using one of the sides of the central triangle and the vertices of the first-stage triangle T10. Memory means B7 is used to store information on the results obtained when the above-mentioned triangles have been divided respectively.

Further, division repetition means B6 is used to set up again a first vertex, a second vertex and a third vertex for each of the central and peripheral triangles, to establish new central and peripheral triangles based on these first, second and third division vertices, and to repeat such division operations similarly for the newly-set triangles, i.e., to divide again the newly-set triangles into the next stage four triangles.

Next, we will describe an example of means for determining the division vertexes necessary in the above-mentioned embodiment.

FIGS. 31-51 illustrate the principles of the invention that can determine the above-mentioned division vertices, and, in particular, FIGS. 31-40 show illustratively the principles to find out such division vertices in a two dimensional manner. It should be noted that, in FIGS. 31 through 51, thick lines represent parts that have appeared newly in the respective figures.

Figure 31:
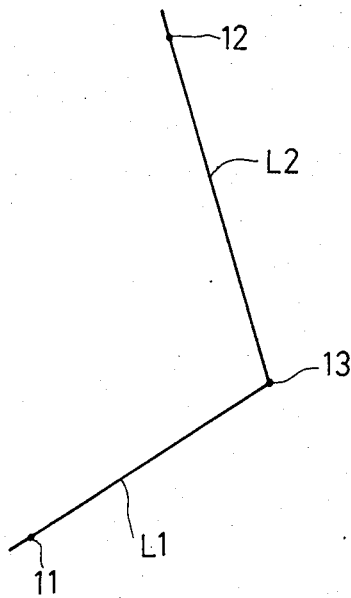
FIG. 31 is a view to illustrate a first-stage setting necessary to determine a vertex of division.

FIG. 31 illustrates the first-stage setting necessary for determination of the division vertices.

In other words, in this figure there are illustrated a first point 11 and a second point 12 respectively set up at arbitrary positions as well as a first straight line L1 passing through the first point 11 and a second straight line L2 passing through the second point 12. Here, it is considered that the first and second points 11 and 12 as well as the first and second straight lines L1 and L2 exist in the same plane. That is, the division vertices are now to be established at desired positions between the first and second points 11 and 12; the first point 11 is considered as the point P11 in FIG. 2, and the second point 12 as P13 in FIG. 2.

In establishing the above-mentioned points and lines, first, a light pen 2, for example, may be set at an arbitrary position on the display unit 4 to set up the first point 11. Next, similarly, the second point 12 is set up at an arbitrary position different from that of the first point 11. Then, the first straight line L1 passing from the first point 11 is established, with the direction thereof being determined by means of a keyboard 1. Likewise, the second straight line L2 passing through the second point 12 is set up, with the direction thereof determined by the keyboard 1. Let an intersection point of the straight lines L1 and L2 be an intersection point 13.

Although in the above description the information on the positions of the points as well as on the directions of the straight lines is inputted using the keyboard 1 and light pen 2, of course, it should be understood that this is not limitative but other suitable input means such as a digitizer may also be employed for this purpose.

Figure 32:
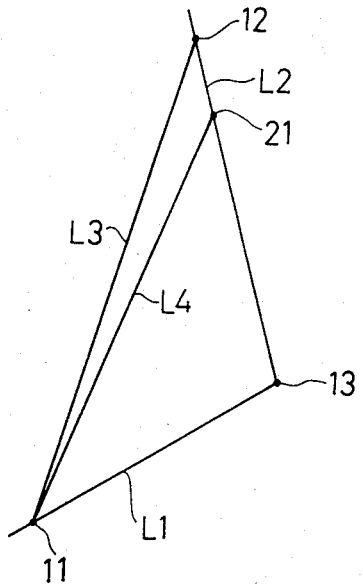
FIG. 32 is a view to illustrate a fundamental triangle and an isosceles triangle formed from the setting condition shown in FIG. 31.

FIG. 32 illustrates a fundamental triangle and an isosceles triangle both formed from the first-stage setting shown in FIG. 31.

First and second points 11 and 12 are joined to draw a line segment, which is denoted by L3 and is also called a chord. Here, the reason why this line L3 is called a chord is that, when a part (a contour line) of a desired form is to be created between the first and second points 11 and 12, if such contour line is considered as a circular arc, then the line L3 corresponds to a chord thereof. This line segment L3 corresponds to the side R12 in FIG. 18.

A triangle which is enclosed by the three lines L1, L2 and L3 is here called a fundamental triangle. In this case, a shorter one of the two sides other than the side formed by the chord L3, among the three sides of this fundamental triangle, is one formed by the line L1. This shorter side is a line segment connecting points 11 and 13 to each other. Then, an isosceles triangle having two equilateral sides each equal to the above-mentioned shorter side is formed such that the isosceles triangle is superposed on the fundamental triangle.

In other words, a new point is set on the line L2 at a position which is equi-distant from the intersection point 13 as with the line L1, and this new point is represented by 21. Thus, the other of the equilateral sides of this isosceles is a line segment joining the point 21 and the intersecting point 13 in FIG. 31. A line segment joining the first point 11 and the new point 21 is called L4.

FIG. 33 illustrates how to determine a constant $\alpha$ that is necessary to find out a third point. Here, the third point corresponds to the division vertex such as the point P22 in FIG. 18 or the like.

Specifically, a straight line bisecting an internal angle of an isosceles triangle at the first point 11 is denoted as L5, and such internal angle is expressed as $\angle(13)(11)(21)$. Here, $\angle(13)(11)(21)$ expresses an angle included by two lines, or, a line segment joining the points 13 and 11, and a line segment joining the points 11 and 21. This way of expression on angles will be employed hereinafter as well.

The above-mentioned constant $\alpha$ can be found as follows:

$$\alpha = \{\text{area of } \Delta(21)(11)(13)\}/\{\text{area of } \Delta(12)(11)(22)\}$$

where $\Delta(21)(11)(13)$ represents a triangle enclosed by the three points 21, 11 and 13. Also, this way of expression on triangles will be employed hereinafter as well.

FIG. 34 illustrates how to find an incenter of the above-mentioned isosceles triangle.

Generally, an incenter of a triangle is an intersection point of bisectors of its respective internal angles and three bisectors intersect at one point. A bisector of the internal angle at the point 21 of the isosceles triangle is denoted by L6. A point where the two bisectors L5 and L6 intersect with each other, i.e., the incenter of the isosceles triangle is represented by 23. A middle point between Point 11 and Incenter 23 is denoted as 24 and a middle point between Point 21 and Incenter 23 is denoted as 25.

FIG. 35 illustrates how to find an incenter of the above-mentioned fundamental triangle.

In this figure, a bisector of the internal angle of the fundamental triangle at Point 11 is represented by a straight line L7; a bisector of the same at Point 12 is represented by a straight line L8; and, an intersection point of the two bisectors L7 and L8 or the incenter of the fundamental triangle is represented by Point 14.

FIG. 36 illustrates how to determine an unequilibrium amount S.

To obtain the above-mentioned third point, a parameter $\beta$ is necessary in addition to the above-mentioned parameter $\alpha$. Then, to obtain this parameter $\beta$, it is necessary to determine the unequilibium amount S, which depends on the difference between the attributes of the fundamental and isosceles triangles.

To determine the unequilibrium amount S, first, FIGS. 34 and 35 are superposed on each other. Then, the bisectors L7 and L8 are extended respectively, a perpendicular L9 is drawn at Point 24, and a perpendicular L10 is drawn at Point 25. Let a triangle enclosed by the perpendicular L9, bisector L8 and line L1 be S1, and a triangle enclosed by the perpendicular L10, bisector L7 and line L2 be S2. Then, the unequilibrium amount S is found as follows:

$$S = \{\text{area of } S1\} - \{\text{area of } S2\}$$

However, alternatively, other suitable techniques than the above may be used to find out such amount S.

FIG. 37 illustrate how to find a distance d between the internal center of the fundamental triangle 14 and a third point to be obtained now.

A straight line joining the incenter 14 and the intersection point 13 is called L11. This line 14 is a bisector of the internal angle of the fundamental triangle at Point 13. Let the third point to be found now to Point 33, and suppose that the third point 33 is present on Line L11. Conversely speaking, when assuming that there exists a point where Bisector L11 intersects with a form to be created, this intersection point is called the third point 33 and it is now to be found out. And, the distance between the third point 33 and the incenter 14 of the fundamental triangle is denoted by d.

The distance d can be obtained as follows:

$$d = \beta(\alpha \cdot S)/\gamma$$

where the parameter $\beta$ is called a position control parameter and the parameter $\gamma$ represents the length from the first point to the second point 12.

FIGS. 36-39 illustrate how to find a third straight line L13 at the third point 12.

Here, Line L13 is a tangent to a form outline at Point 33. In other words, when an outline of a desired form is drawn between the first and second points 11 and 12, a tangent to the outline at Point 33 is the straight line L13 to be obtained. Conversely speaking, Line L13 is a straight line necessary to produce a new third point between the third point 33 and the first point 11. This third straight line L13 is found in the following manner:

A straight line passing through both points 11 and 33 is called L9; a straight line passing through both points 12 and 33 is called L10; and, a bisector of the intersectional angle of the lines L9 and L10 is called L12. This bisector L12 is shown in FIG. 14. A straight line, which intersects with the bisector L12 at an angle of $\theta$ and also passes through the point 33 within the plane of the fundamental triangle, is called L13. The angle $\theta$ can be obtained as follows:

$$\theta = \delta \cdot (\alpha \cdot S)/A$$

where the parameter $\delta$ is called a tangent control parameter and A represents the area of the fundamental triangle. The thus-obtained straight line is the third straight line L13. If the operations described in connection with FIGS. 31 to 37 are executed using this third straight line L13, then the position of a new third point (a point corresponding to P32 in FIG. 19) can be found.

FIG. 40 illustrates a case where the new third point is found in the above-mentioned manner.

Specifically, assuming that the third point 33 is an alternative of the point 12 shown in FIG. 44 and that the third straight line L13 is an alternative of the second straight line shown in FIG. 28, the operations discussed before in connection with FIGS. 31-37 are repeatedly executed. A point 21a corresponds to the point 21 shown in FIG. 32, while a point 13a corresponds to the point 13 in FIG. 31. Therefore, $\Delta(11)(33)(13a)$ is a new fundamental triangle, while $\Delta(11)(21a)(13a)$ is a new isosceles triangle.

Thus, the same operations as illustrated in FIGS. 38 and 39 can be applied to find out a new third straight line. Here, assuming that the third point described above up to FIG. 39 is the division vertex P22 in FIG. 18, the newly-obtained third point becomes the division vertex P32 in FIG. 18.

Also, similar operations are carried out between the second point 12 and the third point 33 to determine a different, new third point and a different, new third straight line.

In this way, a large number of division vertexes between the first point 11 and the second point 12 are set up, and then the large number of division vertexes are used to form a great number of triangles. After then, the thus-formed triangles can be continuously connected to one another so as to provide a dense polyhedron.

Further, the dense polyhedron once created according to the above-mentione principles can be modified by changing its parameters. The parameters include the positions of the first point 11, second point 12 and third point 13 (that is, P11, P12 and P13), the directions of the first and second straight lines L1 and L2, and the contents $\beta, \delta$.

FIGS. 41 to 43 respectively illustrate examples modified in this manner, namely, by changing one or more of the above-mentioned parameters.

Specifically, FIG. 41 illustrates how the locus of the division vertices can be changed when only the directions of the first and second straight lines L1 and L2 among the parameters are varied.

In this figure, a locus C represents the locus of the division vertices obtained when the first and second straight lines are respectively considered as L1 and L2, and the locus C is considered as one of sections of the dense polyhedron. The locus C can be found according to the technique discussed before. Here, while the positions of the first and second points 11 and 12, the position control parameter $\beta$, and the tangent control parameter $\delta$ remain unchanged, if the first and second straight lines are respectively changed to L1b and L2b, then the locus C is altered into a locus expressed by a two-dot chained line Cb. As can be seen from the figure, the feature of the modified locus obtained when the directions of the first and second straight lines L1, L2 are changed is that its convex portions are respectively moved vertically with respect to the bisector L11.

In other words, when the first straight line L1 is rotated clockwise (in this case, the second straight line L2 is rotated counter-clockwise), the convex portions of the two-dot chained line or the locus Cb, as can be seen from comparison with the locus C, are shifted downwardly of the bisector L11. On the contrary, when the first line L1 is rotated counter-clockwise (in this instance, the second line L2 is rotated clockwise), the convex portions of the modified locus are displaced upwardly of the bisector L11.

In the above-mentioned cases, it should be noted that both straight lines L1 and L2 must not be parallel to each other after they are respectively rotated. This condition is necessary to ensure that the locus obtained does not have an inflection point at the first point 11 or the second point 12. Therefore, in case when the locus obtained may have an inflection point at either of the first point 11 or the second point 12, it is not necessary to impose any special conditions on the rotational movement between the first and second straight lines L1 and L2.

FIG. 42 illustrates how the locus of the division vertices can be changed when only the position control parameter $\beta$, among the above-mentioned parameters, is modified.

As the position control parameter $\beta$ is varied, the expansion of the whole form, i.e., the curvature of the locus is changed. FIG. 42 illustrates the change of the locus occurring when, after the position control parameter $\beta$ is set as a positive value and the locus C is once determined, the position control parameter $\beta$ is changed to a negative value. Then, when the position control parameter $\beta$ is changed to the negative value, the locus obtained, Cc, is smaller in expansion when compared with the locus C and comes nearer the chord L3.

In other words, if the position control parameter $\beta$ is set as O, then the form passes through the internal center 14 of the fundamental triangle. If the parameter $\beta$ is set as a positive value, then the locus obtained is expanded in such a manner that it comes nearer the intersection point 13 other than the internal center 14. The greater the parameter $\beta$ is, the nearer the locus comes towards the intersection point 13. On the other hand, if the parameter $\beta$ is set as a negative value, then the locus obtained is contracted such that it comes nearer the chord L3 other than the internal center 14; the greater the absolute value of the parameter $\beta$, the closer to the chord L3 the locus comes or is contracted. This means that the locus C comes closer to a straight line. The word "position" included in the term "position control parameter" means a position where the locus to be created intersects with the bisector L11; thus, to change the position control parameter $\beta$ means that the intersecting position is changed. Accordingly, in the remaining portions of the created locus other than the intersecting portion thereof, the locus is to be changed only in curvature. Also, in case when the locus created prior to the change of the positional control parameter $\beta$ is contained within the fundamental triangle, even if the position control parameter $\beta$ is changed thereafter, the created locus will never be bulged out of the fundamental triangle.

FIG. 43 illustrates how the locus can be changed when only the tangent control parameter $\delta$, among the above-mentioned parameters, is varied.

When the tangent control parameter $\delta$ is varied, the expansion of the form or the locus can be changed between two points (or, the then first and second points) used to create (or modify) the form.

Specifically, it is assumed that the locus C is once determined between the first and second points 11 and 12. Here, the third straight line L13 is the same as the tangent of the locus C at the third point 33. At the next time after the third point 33 and the third straight line L13 are determined, a new third point is determined between the first and third points, 11 and 13, according to the directions of this tangent L13 and the first straight line L1; in this way, the locus will be determined gradually.

By the way, to change the tangent control parameter $\delta$ means to change the direction of the above-mentioned tangent (or, the third straight line L13). Therefore, the change of the tangent control parameter $\delta$ is the same as changing the direction of the second straight line L2 when a form is originally created, and thus this case can be considered similar to the prior case discussed in connection with FIG. 42. However, in this case, since the first straight line L1 is left unchanged, a discontinuity is present in the middle of the form (i.e., at the third point 33).

In particular, if the tangent control parameter $\delta$ is changed at the third point 33 to alter the direction of the third straight line L13, for example, to that of the straight line L13d, then, between the third point 33 and the first point 11, the locus C is changed to the locus shown by a two-dot chained line Cd. Namely, if the parameter $\delta$ is varied to rotate the third straight line L13 clockwise, then, in its portions downwardly of the bisector L11, the form to be created is expanded to the right in the drawing. Thus, it can be understood that this tangent control parameter $\delta$ is significant in enhancing the degree of freedom of the operation to create a form.

As described above, the above-mentioned position control parameter $\beta$ and tangent control parameter $\delta$ can be changed between the third point 33 and the first point 11 or between the third point 33 and the second point 12 to create or modify a form therebetween. At the same time, the values of the parameters $\beta$, $\delta$ can also be changed between every point of the locus C and a different point thereof. Therefore, the form of the locus C can be modified wholly or in the desired portions thereof easily and freely.

FIG. 44 is an explanatory view to illustrate the principles to find out a third straight line in a simple way.

That is, an intersection point between the extension of the straight line L9 and the second straight line L2 is considered as a point 34; an intersection point between the extension of the straight line L10 and the first straight line L1 is considered as a point 35; these points 34 and 35 are joined to draw a straight line and it is called L14; and, this straight line L14 is displaced parallelly onto the third point 33 to draw a straight line and it is called L15. This straight line L15 is used instead of the third line L13. In case when $\theta$ is indefinite in accuracy, it is convenient to use the thus-obtained straight line L15 for the third straight line.

The above-mentioned explanation is normally applied to creation or modification of a planar form. However, if this manner of the form creation is applied, a three-dimensional form can be created or modified. That is, a planar form is first created in the above-mentioned manner, and then the thus-formed forms are piled up on one another to create a form in the form of a so-called flexible wire frame or network frame.

Also, although the above-mentioned explanation relates to a case where a form is created, it can be applied to a case where an existing form is described. In other words, a form resembling the existing form is created roughly, and then the roughly-created form may be controlled by varying the position control parameter $\beta$ or the tangent control parameter $\delta$. Alternatively, in some cases, the positions of the first and second points 11 and 12 and the directions of the straight lines L1 and L2 may be changed.

Next, we will describe the principles to determine a locus of division vertices three-dimensionally.

In this case, a three-dimensional locus is not directly formed, but a plurality of three-dimensional contour lines of the locus are first formed, and then these contour lines are connected to one another successively to create a desired form.

FIG. 45 illustates a state in which a first point 51, a second point 52, a first straight line L51 and a second straight line L52 have been established. Here, the first straight line L51 passes through the point 51, while the second straight line L52 passes through the point 52. And, the first and second points 51 and 52 are joined to produce a chord 50. The reason why the straight line joining the first and second lines is expressed as "chord" is the same as that explained in connection with FIG. 16.

Here, it is assumed that the extension of the first straight line L51 does not intersect with the extension of the second straight line L52. That is, since the locus of division vertices to be created here is a three-dimensional one, most of the contour lines to be drawn now between the first and second points 51 and 52 do not exist in a plane. Also, the first straight line L51 should be a tangent to the contour line at the first point 51, and the second straight line L52 be a tangent to the contour line at the second point 52. For this reason, most of the first and second straight lines L51 and L52 do not intersect with each other.

FIG. 46 illustrates a state in which the first straight line L51 has been orthogonally projected in a surface formed by the chord 50 and the second straight line L52. The orthogonally-projected straight line of the first straight line L51 is called L53. That is, the shadow of the first straight line L51 obtained when a perpendicular light is cast onto a surface formed by the chord 50 and the straight line L52 is called a straight line L53.

FIG. 47 illustrates a state in which the second straight line L52 has been orthogonally projected in a surface formed by the chord 50 and the first straight line L51. The orthogonally-projected straight line of the second straight line L52 is called L54. That is, the shadow of the second straight line L52 obtained when a perpendicular light is cast onto a surface formed by the chord 50 and the first straight line L51 is called a straight line L54.

FIG. 48 illustrates how to form a fundamental triangular pyramid.

Specifically, points 53 and 54 are joined to draw a straight line and it is called L55. In this way, four surfaces are created which are respectively enclosed by lines 50, L51, L52, L53, L54 and L55. A triangular pyramid enclosed by these four surfaces is called a fundamental triangular pyramid.

Figure 49:
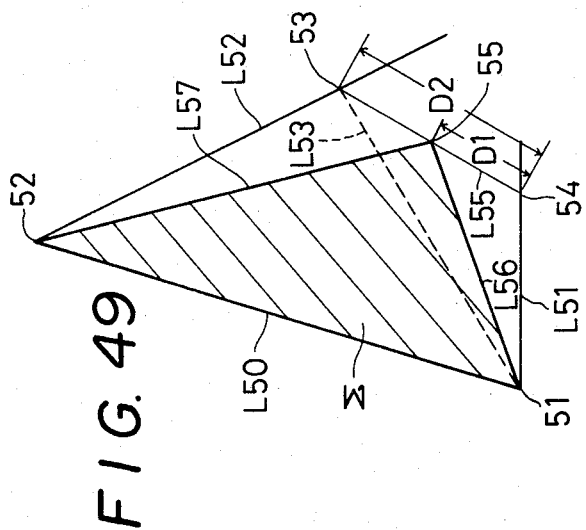
FIG. 49 is a view to explain how to form a provisional triangle.

FIG. 49 illustrates how to form a provisional triangle Σ.

Specifically, a point 55 on the line segment L55 is found from a torsion control parameter $\epsilon$. This torsion control parameter $\epsilon$ can be obtained by:

$$\epsilon = D1/D2$$

where D1 is the distance between the points 54 and 55, and D2 is the distance between the points 54 and 53. And, the two distances D1, D2 are to be determined according to cases, respectively. If the torsion control parameter $\epsilon$, which is a ratio of D1 to D2, is varied, then a form to be created is changed.

Alternatively, the torsion control parameter $\epsilon$ may be obtained in the form of a ratio of angles. A line segment joining the two points 55 and 51 is called L56, and a line segment joining the point 55 and the second point 52 is called L57. Then, a triangle that is enclosed by these three line segments L50, L56 and L57 is called a provisional triangle Σ.

Figure 50:
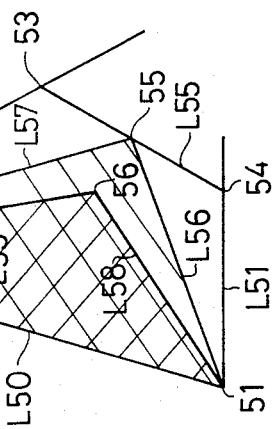
FIG. 50 is a view to explain how to form a fundamental triangle within a provisional triangle Σ.

FIG. 50 illustrates how to form a fundamental triangle within the provisional triangle Σ.

In particular, a line obtained when the first straight line L51 is orthogonally projected in the provisional triangle Σ is called L58. A line obtained when the second straight line L52 is orthogonally projected in the provisional triangle Σ is called L59. A point where these straight lines L58 and L59 intersect with each other is called an intersection point 56.

A triangle that is enclosed by the thus-formed straight lines L58 and L59 and line segment 50 is a three-dimensional fundamental triangle necessary to create a locus of three-dimensional division vertices. This three-dimensional fundamental triangle corresponds to the fundamental triangle that was formed in FIG. 16 in creating the two-dimensional form.

Figure 51:
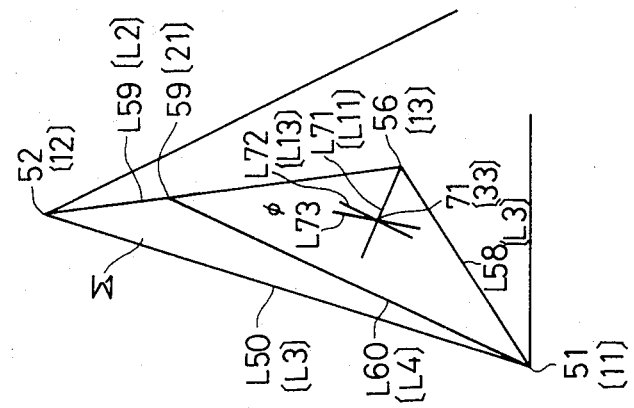
FIG. 51 is a view to explain how to find out a third straight line in determining a three-dimensional locus of division vertexes.

FIG. 51 is an explanatory view to illustrate how to form an isosceles triangle from the three-dimensional fundamental triangle.

In other words, the above-mentioned three-dimensional fundamental triangle can be treated similarly to the fundamental triangle shown in FIG. 32, and thus, when a form is created at a desired time, the same concept as in the abovementioned two-dimensional form can also be applied to this three-dimensional case. Specifically, if the same operations as in FIGS. 31–39 are performed based on a three-dimensional fundamental triangle Δ(52)(51)(56) and an isosceles triangle Δ(59)(51)(56), a third point 71 and a third straight line L73 can be found three-dimensionally.

However, when forming a three-dimensional locus of division vertices, it is necessary to use a torsion control auxiliary parameter $\phi$. That is, a tangent at Point 71 to a contour line of a form to be obtained has a certain angle relative to the third straight line L73 within the surface of the three-dimensional fundamental triangle. This angle is the torsion control auxiliary parameter $\phi$. Thus, this angle must be taken into consideration in this case. A straight line obtained when such torsion control auxiliary parameter $\phi$ is taken into account is called L72.

In FIG. 51, references shown within symbols [ ] correspond to the points or straight lines shown in FIGS. 31–40, respectively.

In this way, if the straight line obtained in consideration of the torsion control auxiliary parameter $\phi$ and the first straight line L51 or the second straight line L52 are used to perform the operations illustrated in FIGS. 45–51, then a new third point or a new third straight line can be found. If these operations are repeated, then the contour lines of the three dimensional locus of the division vertices can be obtained. If the triangles are divided successively according to the thus-obtained division vertices, then a dense polyhedron can be created easily.

Also, for example, let the coordinates of the first point 51 be (2. 0, 0. 0, 0.0), let the directio cosine of he first straight line L51 be (0. 0, 0. 7232, 0. 6906), let the coordinates of the second point 52 be (0. 0, 2. 0, π), let the direction cosine of the second straight line L52 be (−0.7232, 0.0, 0.6906), let the position control parameter β be 0, let the tangent control parameter δ be 0, let the torsion parameter ε be 0.5, and let the torsion control auxiliary parameter φ be −0.0467, then the locus of division vertices formed according to these factors provides an isoclinically formed (or, a sprial) form.

FIG. 52 illustrates a block diagram of an embodiment of a device used to determine division vertices employed in the present invention.

There are provided a first-point setting means 81 for setting up the first point 11 at an arbitrary position and a second-point setting means 82 for setting up the second point 12 at an arbitrary position other than that of the first point 11, which means are both based on the principles as shown in FIG. 44. Also, there are arranged a first-straight-line setting means 83 to set up the first straight line L1 passing through the first point 11 in an arbitrary direction, and a second-straight-line setting means 84 to set up the second straight line L2 passing through the second point 12 in an arbitrary direction. Such setting means 81–84 may include input means such as the keyboard 1 and the light pen 2. Further, there is included in this embodiment a third-point/straight-line determination means 85 for determining the position of the third point 33 and the direction of the third straight line L13 containing the third point 33 in accordance with the position of the first point 11 and the direction of the first straight line L1 as well as the position of the second point 12 and the direction of the second straight line L2, which means is operable based on the principles as illustrated in FIGS. 31–39. The third point/straight line determination means 85 is adapated to perform its function by use of the operation circuit 3.

When finding a locus of division vertices in a two-dimensional way, principles similar to those discussed in FIGS. 31–39 can be applied while in order to find a locus of division vertices in a three dimensional manner, it is necessary to employ the principles described in FIGS. 46–51. The operational circuit 3 is arranged to be able to realize all of these principles. Alternatively, a computer may be used instead of the operation circuit 3.

Further, the third-point/straight-line determination means 85 is equipped with an input means 86 for inputting the parameters β, δ, ε, φ and the like. As an example of this input means 86, the keyboard 1 may be included. There is also provided a memory unit 87 which stores information on each of points determined by the third-point/straight-line determination means 85.

As can be seen from the foregoing description, the embodiment illustrated in FIG. 52 is arranged to find a third point from the first point 11 and the first straight line L1 as well as the second point 12 and the second straight line L2 as a temporary measure.

FIG. 53 illustrates a modification of the above-mentioned embodiment in FIG. 52, wherein there is added a control means 88 to control each of the above-mentioned means 81–84 repeatedly based on the points and the directions of the straight lines running on such points previously set up or determined as well as the points and the directions of the straight lines running thereon newly determined by the determination means 88 so as to provide a large number of points between the first point 11 and the second point 12. This control means 88 can be operated on similar principles to those explained in FIG. 40.

Figure 54:
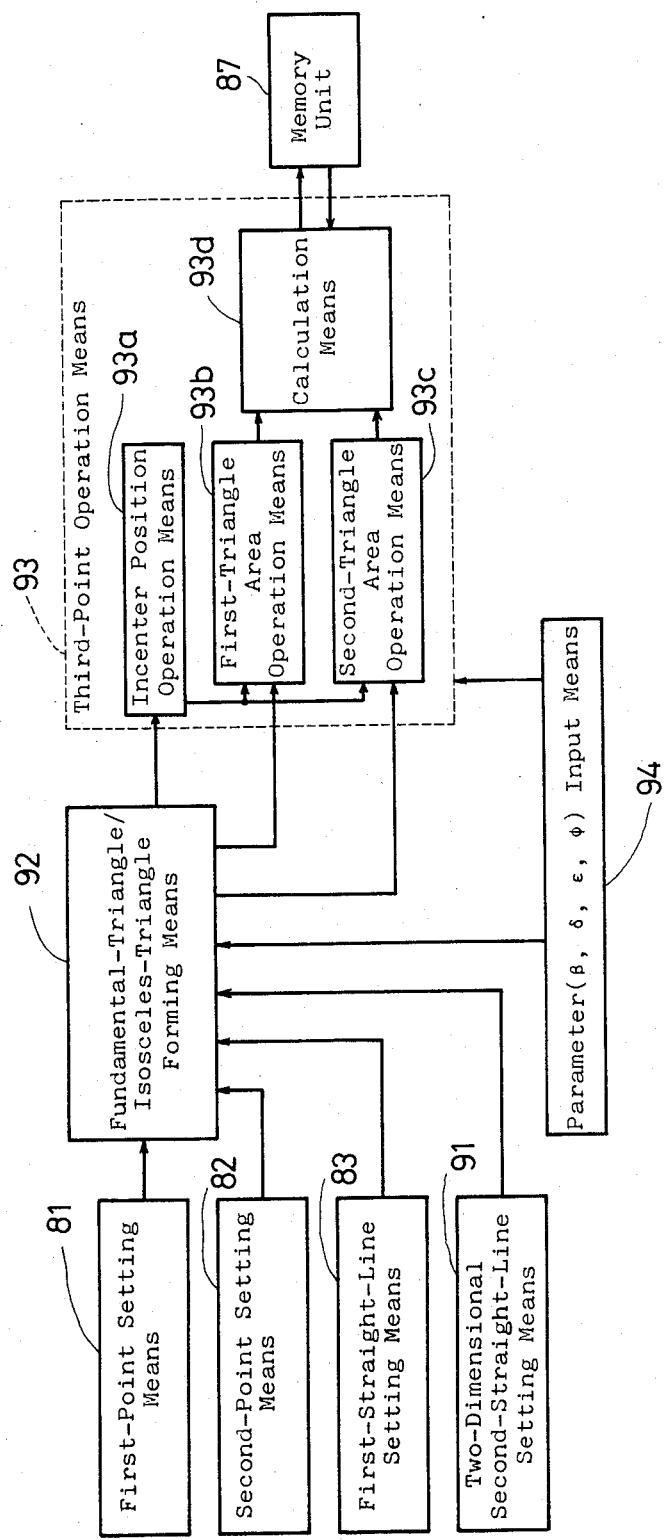

FIG. 54 illustrates a block diagram of a system which determines a locus of division vertices two-dimensionally.

In this block diagram, there are provided a first-point setting means 81 for setting up a first point 11 at an arbitrary position, and a second-point setting means 82 for setting up a second point 12 at a different, arbitrary position from that of the first point 11, both of which can be operated on similar principles to those in FIG. 31. Also, there are included a first-straight-line setting means 83 to set up a first straight line L1 passing through the first point 11 in an arbitrary direction, and a two-dimensional second-straight-line setting means 91 to set up a second straight line L2 in an ariburary direction which passes through the second point 12 ans also exists within a surface formed by the first point 11 and the first straight line L1.

Further, there is provided an isosceles triangle forming means 92 for forming an isosceles triangle of a type having two equilaterals each of which is equal to a shorter one of the two sides other than the side formed by the chord L3, among the three sides of the fundamental triangle formed by the chord L3 joining the first and second points 11 and 12, the first straight line L1 and the straight straight line L2. This forming means 92 can be operated on the same principles as in FIGS. 31–33.

In additio, there is included a third-point operation means 93 for operating the position of the third point and the direction of the straight line containing the third point based on the difference between the attribute of the fundamental triangle and that of the above-mentioned isosceles triangle, which can be operated on principles similar to those shown in FIGS. 34–40 and 44.

In detail, the third-point operation means 93 comprises: an internal center position operation means 93a (which can be operated on similar principles to those in FIGS. 18 and 19) for calculating the positions of the internal centers of the fundamental and isosceles triangles; a first-triangle-area operation means 93b (which can be operated on similar principles to those in FIG. 20) for calculating the area of a first triangle which is enclosed by a straight line joining the internal center of the fundamental triangle and one of the vertices thereof other than one of a given angle commonly shared by the fundamental and isosceles triangles, a perpendicular bisector of a line segment joining the internal center of the isosceles triangle and one vertex of the isosceles triangle opposed to said one vertex of the fundamental triangle, and one side of the fundamental triangle opposed to said one vertex thereof; a second-triangle-area operation means 93c (which can be operated on similar principles to those in FIG. 20) for calculating the area of a second triangle which is enclosed by a straight line joining the internal center of the fundamental triangle and the other vertex of the fundamental triangle other than said one vertex of a given angle thereof, a perpendicular bisector of a line segment joining the internal center of the isosceles triangle and one vertex of the isosceles triangle opposed to said other vertex of the fundamental triangle, and a side of the fundamental triangle opposed to said other vertex thereof; and, a calculation means 93d (which can be operated on principles similar to those illustrated in FIGS. 37–39) for calculating, as the position of the third point, the position of a point existing on a bisector of said given angle that is spaced apart from the position of the internal center of the fundamental triangle by a distance that depends on the difference between the areas of the first and second triangles as well as on the distance between the first and second points.

Third-point operation means 93 further includes means 94 for inputting the parameters $\beta$, $\delta$, $\epsilon$, $\phi$ and a memory unit 87 for storing information on each of the points determined by the third-point operation means 93 itself. Operation circuit 3 is adapted to be capable of performing the functions of the above-mentioned fundamental and isosceles triangles forming means 92 as well as the third-point operation means 93.

Accordingly, the present invention is capable of detecting easily the position of an intersection point where a predetermined straight line and a predetermined surface intersect with each other, of cutting a predetermined surface linearly or curvedly to form its sectional face easily, or of obtaining a contour line of intersection, that is, a continuity of intersection points where a predetermined surface and other surfaces intersect with each other. The invention is also capable of creating a form by means of a continuation of a large number of small triangles, or modifying the thus-created form with ease. Accordingly, the present invention can be applied to form a working machine, a form recognition device, an image processor, an auto-drawing instrument, an image creator and the like in NC machine tools or the like. In these applications, the invention can perform three-dimensional operations or drive the above-mentioned machines.

As has been described hereinbefore, the present invention provides an improved unique sytem for creating forms which provides for free access to a form to be created throughout the whole process ranging from its model design step to its manufacturing step.

What is claimed is:

1. A form creating system comprising:

straight line setting means for setting up a straight line passing through a desired point and having a desired direction;

surface-to-be-detected setting means for setting up a surface to be detected which has a desired shape and from which an intersection point position is to be detected;

surface division means for dividing a predetermined surface into a predetermined number of surfaces; and, intersection-point-containing-surface detection means for detecting an intersection point containing surface that contains an intersection point of said straight line and said surface to be detected, out of said predetermined number of surfaces divided by said surface division means, characterized in that said surface to be detected is divided into a predetermined number of surfaces by said surface division means, said intersection point containing surface is detected from these divided surfaces, and said intersection point containing surface is again divided into a predetermined number of surfaces, said intersection point containing surface is detected from these divided surfaces, and these division/detection operations are repeated to detect said intersection point of said straight line and said surface to be detected.

2. The form creating system as set forth in claim 1, characterized in that said surface division means is adapted to divide said predetermined surface into four triangles.

3. A form creating system comprising:

straight line setting means for setting up a straight line passing through a desired point and having a desired direction;

surface-to-be-detected setting means for setting up a surface to be detected which has a desired shape and from which an intersection point position is to be detected;

surface division means for dividing a predetermined surface into a predetermined number of surfaces;

intersection-point-containing-surface detection means for detecting an intersection point containing surface that contains an intersection point between said straight line and said surface to be detected, out of said predetermined number of surfaces divided by said surface division means; and, straight line moving means for moving said straight line by a given distance, characterized in that said surface to be detected is divided into a predetermined number of surfaces by said surface division means, said intersection point containing surface is detected out of the thus-divided surfaces, said intersection point containing surface is again divided into a predetermined number of surfaces, said intersection point containing surface is detected out of the-thus divided surfaces, and these division/detection operations are repeatedly performed to detect said intersection point between said straight line and said surface to be detected, and in that similar operations to said division/detection operations are repeatedly performed on said straight line moved by said straight line moving means as well.

4. The form creating system as set forth in claim 3, characterized in that said surface division means is adapted to divide said predetermined surface into four triangles.

5. The form creating system as set forth in claim 3, characterized in that said straight line moving means is adapted to displace said straight line parallelly and successively.

6. The form creating system as set forth in claim 3, characerized in that said straight line moving means is adapted to displace said straight line parallel in a straight line.

7. The form creating system as set forth in claim 3, characterized in that said straight line moving means is adapted to displace said straight line parallel in a curved line.

8. A form creating system comprising:

standard surface setting means for setting up a standard surface having a desired shape;

partner surface setting means for setting up a partner surface which has a desired shape and is different from said standard surface;

surface division means for dividing a predetermined surface into a predetermined number of surfaces; and, intersecting surface detection means for detecting an intersecting surface having vertices respectively present in different sides with respect to said standard surface, out of said predetermined number of surfaces divided by said surface division means from said partner surface, characterized in that said partner surface is divided into a predetermined number of surfaces by said surface division means, said intersecting surface is detected out of said predetermined number of thus-divided surfaces, said intersecting surface is again divided into said predetermined number of surfaces, said intersecting surface is detected out of said predetermined number of thus-divided surfaces, and these division/detection operations are repeatedly performed to detect a contour line of intersection of said partner and standard surfaces.

9. The form creating system as set forth in claim 8, characterized in that said surface division means is adapted to divide said predetermined surface into four triangles.

10. The form creating system as set forth in claim 8, characterized in that said intersecting surface detection means is adapted to consider said predetermined surface as said intersecting surface in case when the direction of one vertex of said predetermined surface with respect to said standard surface when viewed from a predetermined direction is different from those of other vertices thereof with respect to said standard surface when viewed from said predetermined direction.

11. A form creating method comprising the steps of:
setting up a first-stage triangle having a desired shape;
setting up three arbitrary points;
joining said three points one another to form a central triangle;
combinining one of the three vertices of said first-stage triangle with one of the three sides of said central triangle corresponding to said one vertex to form a peripheral triangle, thereby forming three peripheral triangles outside said central triangle sequentially; and,
forming a total of four second-stage triangles from said central triangle and said three peripheral triangles.

12. A form creating method comprising the steps:
setting up a first-stage triangle having a desired shape;
setting up three arbitrary points;
joining said three points one another to form a central triangle;
combining one of the three vertices of said first-stage triangle with one of the three sides of said central triangle corresponding to said one vertec to form a peripheral triangle, thereby forming three peripheral triangles outside said central triangle sequentially;
forming a total of four second-stage triangles from said central triangle and said three peripheral triangles;
assigning identification numbers to said three peripheral triangles in order of a counterclock-wise direction and then an identification number to said central triangle; and,
assigning said indentification numbers to the sides of each of said second-stage triangles respectively in order of a clockwise direction,
characterized in that topological structures can be determined for said second-stage triangles similarly to a plane graph.

13. The forming creating method as set forth in claim 12, characterized in that said identification numbers assigned to said sides of each of said second-stage triangles in order of a clockwise direction are 1, 2, and 3, the vertices of each of said second-stage triangles are assigned identification numbers, or 1, 2, and 3 respectively in order of a counter-clockwise direction, and the sum of the identification number assigned to one of the vertices of each of said second-stage triangles and the identification number of the side opposed to said vertex is 4.

14. A form creating method comprising the steps of:
setting up a first-stage triangle having a desired shape;
setting up three arbitrary points;
joining said three points one another to form a central triangle;
joining one of the three vertices of said first-stage triangle and one of the sides of said central triangle corresponding to said vertex to form a peripheral triangle, thereby forming three peripheral triangles outside said central triangle sequentially;
Repeating said steps for each of a total of four second-stage triangles each comprising said central triangle and said three peripheral triangles to form a total of four third-stage triangles comprising one central triangle and three peripheral triangles for each of said second-stage triangles; and,
Repeating said steps a predetermined number of times to form a large number of small triangles based on said first-stage triangle and then connecting said large number of small triangles to one another to form a dense polyhedron.

15. A form creating system comprising:
first-stage triangle setting means for setting up a first-stage triangle having a desired shape;
first division vertex setting means for setting up a first division vertex in accordance with two vertices concerned with an arbitrary side of said first-stage triangle;
second division vertex setting means for setting up a second division vertex in accordance with two vertices concerned with the other side of said first-stage triangle;
third division vertex setting means for setting up a third division vertex in accordance with two vertices concerned with the remaining side of said first-stage triangle;
central triangle setting means for joining said first division vertex, said second division vertex and said third division vertex to set up a central triangle; and,
peripheral triangle setting means for joining one of the sides of said central triangle and one of the vertices of said first-stage triangle to set up a peripheral triangle, thereby setting up three peripheral triangles.

16. The form creating system as set forth in claim 15, characterized in that each of said division vertex setting means comprises:
means for setting up a first straight line passing through one of the vertices of said first-stage triangle in an arbitrary direction;
means for setting up a second straight line passing through the other vertex of said first-stage triangle in an arbitrary direction; and,
means for setting up one of said arbitrary three points in accordance with the position of said one vertex and the direction of said first straight line as well as the position of said other vertex and the direction of said second straight line.

17. A form creating system comprising:
first-stage triangle setting means for setting up a first-stage triangle having a desired shape;
first division vertex setting means for setting up a first division vertex in accordance with two vertices concerned with an arbitrary side of said first-stage triangle;
second division vertex setting means for setting up a second division vertex in accordance with two vertices concerned with the other side of said first-stage triangle;
third division vertex setting means for setting up a third division vertex in accordance with two vertices concerned with the remaining side of said first-stage triangle;

central triangle setting means for joining said first division vertex, said second division vertex and said third division vertex to set up a central triangle;

peripheral triangle setting means for joining one of the sides of said central triangle and one of the vertices of said first-stage triangle to set up a peripheral triangle, thereby setting up three peripheral triangles; and, division repetition means for setting up said first, second and third division vertices for each of said central and peripheral triangles, setting up said central and peripheral triangles, and repeating similar operations to the above-mentioned operations on triangles formed from said central and peripheral triangles as well sequentially to divide said thus-formed triangles into four triangles respectively, characterized in that a large number of triangles formed based on said first-stage triangle are connected successively to form a dense polyhedron.

* * * * *